US008359208B2

(12) United States Patent
Slutzky et al.

(10) Patent No.: US 8,359,208 B2
(45) Date of Patent: Jan. 22, 2013

(54) WELLNESS PROGRAM MANAGEMENT AND INTEGRATION WITH PAYROLL VENDOR SYSTEMS

(75) Inventors: Stuart Slutzky, Deerfield, IL (US); Matthew Thomas Ungs, Glencoe, IL (US); Christine Mary Brophy, Montgomery Village, MD (US)

(73) Assignee: Discover Holdings Limited, Sandton (ZA)

( * ) Notice: Subject to any disclaimer, the term of this patent is extended or adjusted under 35 U.S.C. 154(b) by 770 days.

(21) Appl. No.: 12/122,549

(22) Filed: May 16, 2008

(65) Prior Publication Data
US 2008/0255979 A1 Oct. 16, 2008

Related U.S. Application Data

(63) Continuation-in-part of application No. 12/112,165, filed on Apr. 30, 2008, which is a continuation of application No. 09/982,274, filed on Oct. 17, 2001, now Pat. No. 8,131,570, which is a continuation-in-part of application No. 09/265,240, filed on Mar. 9, 1999, now abandoned.

(51) Int. Cl.
*G06Q 10/00* (2012.01)
(52) U.S. Cl. .................................. 705/3; 705/2
(58) Field of Classification Search ............... 705/2, 3
See application file for complete search history.

(56) References Cited

U.S. PATENT DOCUMENTS

| | | | |
|---|---|---|---|
| 4,556,216 A | 12/1985 | Ptikanen | |
| 4,699,375 A | 10/1987 | Appelbaum et al. | |
| 4,831,526 A | 5/1989 | Luchs et al. | |
| 4,837,693 A | 6/1989 | Schotz | |
| 4,860,275 A | 8/1989 | Kakinuma et al. | |
| 4,975,840 A | 12/1990 | DeTore et al. | |
| 5,062,645 A | 11/1991 | Goodman et al. | |
| 5,136,502 A | 8/1992 | Van Remortel et al. | |
| 5,297,026 A | 3/1994 | Hoffman | |
| 5,301,105 A | 4/1994 | Cummings, Jr. | |
| 5,324,077 A | 6/1994 | Kessler et al. | |
| 5,429,506 A | 7/1995 | Brophy et al. | |
| 5,490,260 A | 2/1996 | Miller et al. | |

(Continued)

FOREIGN PATENT DOCUMENTS

| | | |
|---|---|---|
| AU | 2001/276596 | 3/2003 |
| AU | 2005/323847 | 2/2007 |

(Continued)

OTHER PUBLICATIONS http://www.google.com/url?sa=t&rct=j&q=&esrc=s&frm=1& source=web&cd=3&ved=0CJQBEBYwAg&url=http%3A%2F% 2Fwww.wellsource.com%2Fsite%2Fdownload%2Fasset%2F16% 2F10%2F92%2Fc569ea541b1e4b1f39957cf6aa5f1478&ei=8I44 T93RM6bY0QGy3tW5Ag&usg=AFQjCNG_wzDRHpRK11 pAjygoYW5wyJfpsA.*

(Continued)

*Primary Examiner* — Robert Morgan
*Assistant Examiner* — Maroun Kanaan
(74) *Attorney, Agent, or Firm* — Fleit Gibbons Gutman Bongini & Bianco, PL; Paul D. Bianco; Gary S. Winer

(57) ABSTRACT

A computer implemented method is disclosed for receiving employee usage information associated with at least one employee's usage of a wellness program. A status level associated with the at least one employee for the wellness program is determined based on the employee usage information. A status level indicates a degree of participation in the wellness program. A data set is created comprising at least the status level associated with the at least one employee. The data set is in a format acceptable by a payroll vendor without conversion of the data set. The data set is then sent to an employer of the at least one employee.

20 Claims, 10 Drawing Sheets

U.S. PATENT DOCUMENTS

| | | | |
|---|---|---|---|
| 5,542,420 A | 8/1996 | Goldman et al. | |
| 5,549,117 A | 8/1996 | Tacklind et al. | |
| 5,550,734 A | 8/1996 | Tarter et al. | |
| 5,574,803 A | 11/1996 | Gaborksi et al. | |
| 5,630,073 A | 5/1997 | Nolan | |
| 5,631,828 A | 5/1997 | Hagan | |
| 5,655,085 A | 8/1997 | Ryan et al. | |
| 5,655,997 A | 8/1997 | Greenberg et al. | |
| 5,692,501 A | 12/1997 | Minturn | |
| 5,722,418 A | 3/1998 | Bro | |
| 5,745,893 A | 4/1998 | Hill et al. | |
| 5,752,236 A | 5/1998 | Sexton et al. | |
| 5,774,883 A | 6/1998 | Anderson et al. | |
| 5,832,467 A | 11/1998 | Wavish | |
| 5,867,821 A | 2/1999 | Ballantyne et al. | |
| 5,890,129 A | 3/1999 | Spurgeon | |
| 5,933,809 A | 8/1999 | Hunt et al. | |
| 5,933,815 A | 8/1999 | Golden | |
| 5,937,387 A * | 8/1999 | Summerell et al. | 705/2 |
| 5,956,691 A | 9/1999 | Power | |
| 5,987,434 A | 11/1999 | Libman | |
| 5,991,744 A | 11/1999 | Dicrese | |
| 6,039,688 A * | 3/2000 | Douglas et al. | 600/300 |
| 6,049,772 A | 4/2000 | Payne et al. | |
| 6,085,174 A | 7/2000 | Edelman | |
| 6,085,976 A | 7/2000 | Sehr | |
| 6,108,641 A | 8/2000 | Kenna et al. | |
| 6,112,986 A | 9/2000 | Berger et al. | |
| 6,151,586 A | 11/2000 | Brown | |
| 6,163,770 A | 12/2000 | Gamble et al. | |
| 6,169,770 B1 | 1/2001 | Henely | |
| 6,230,142 B1 | 5/2001 | Benigno et al. | |
| 6,338,042 B1 * | 1/2002 | Paizis | 705/7.37 |
| 6,385,589 B1 | 5/2002 | Trusheim et al. | |
| 6,513,532 B2 | 2/2003 | Mault et al. | |
| 6,587,829 B1 | 7/2003 | Camarda et al. | |
| 6,602,469 B1 | 8/2003 | Maus et al. | |
| 6,611,815 B1 | 8/2003 | Lewis et al. | |
| 6,965,868 B1 | 11/2005 | Bednarek | |
| 7,319,970 B1 | 1/2008 | Simone | |
| 7,380,707 B1 | 6/2008 | Fredman | |
| 7,383,223 B1 | 6/2008 | Dilip et al. | |
| 7,398,217 B2 | 7/2008 | Lewis | |
| 7,624,032 B2 | 11/2009 | Radson et al. | |
| 7,630,937 B1 | 12/2009 | Mo et al. | |
| 7,685,007 B1 | 3/2010 | Jacobson | |
| 7,797,175 B2 | 9/2010 | Luedtke | |
| 8,131,570 B2 | 3/2012 | Levin et al. | |
| 2001/0037214 A1 | 11/2001 | Raskin et al. | |
| 2001/0053984 A1 | 12/2001 | Joyce | |
| 2002/0002495 A1 | 1/2002 | Ullman | |
| 2002/0013717 A1 | 1/2002 | Ando et al. | |
| 2002/0016923 A1 | 2/2002 | Knaus | |
| 2002/0029158 A1 | 3/2002 | Wolff et al. | |
| 2002/0035486 A1 | 3/2002 | Huyn et al. | |
| 2002/0038310 A1 | 3/2002 | Reitberg | |
| 2002/0042763 A1 | 4/2002 | Pillay | |
| 2002/0049617 A1 | 4/2002 | Lencki et al. | |
| 2002/0055859 A1 | 5/2002 | Goodman et al. | |
| 2002/0087364 A1 | 7/2002 | Lerner et al. | |
| 2002/0103678 A1 | 8/2002 | Burkhalter et al. | |
| 2002/0111827 A1 | 8/2002 | Levin et al. | |
| 2002/0116231 A1 | 8/2002 | Hele et al. | |
| 2002/0116266 A1 | 8/2002 | Marshall | |
| 2002/0138309 A1 | 9/2002 | Thomas | |
| 2002/0152097 A1 | 10/2002 | Javors | |
| 2002/0184129 A1 | 12/2002 | Arena | |
| 2003/0009355 A1 | 1/2003 | Gupta | |
| 2003/0028483 A1 | 2/2003 | Sanders et al. | |
| 2003/0055767 A1 | 3/2003 | Tamura | |
| 2003/0065561 A1 | 4/2003 | Brown | |
| 2003/0120521 A1 | 6/2003 | Sherman | |
| 2003/0120570 A1 | 6/2003 | Dellinger | |
| 2003/0135391 A1 | 7/2003 | Edmundson | |
| 2003/0149596 A1 | 8/2003 | Bost | |
| 2003/0194071 A1 | 10/2003 | Ramian | |
| 2003/0200101 A1 | 10/2003 | Adler | |
| 2003/0200142 A1 | 10/2003 | Hicks et al. | |
| 2003/0208385 A1 | 11/2003 | Zander | |
| 2003/0212579 A1 | 11/2003 | Brown | |
| 2003/0233278 A1 | 12/2003 | Marshall | |
| 2004/0030625 A1 | 2/2004 | Radson et al. | |
| 2004/0039608 A1 | 2/2004 | Mazur | |
| 2004/0039611 A1 | 2/2004 | Hong | |
| 2004/0059608 A1 | 3/2004 | Gore et al. | |
| 2004/0088219 A1 | 5/2004 | Sanders et al. | |
| 2004/0098279 A1 | 5/2004 | Frazier | |
| 2004/0138928 A1 | 7/2004 | Monk | |
| 2004/0267570 A1 | 12/2004 | Becker et al. | |
| 2005/0010453 A1 | 1/2005 | Terlizzi | |
| 2005/0033609 A1 | 2/2005 | Yang | |
| 2005/0038679 A1 | 2/2005 | Short | |
| 2005/0055249 A1 | 3/2005 | Helitzer | |
| 2005/0060209 A1 | 3/2005 | Hill | |
| 2005/0071205 A1 | 3/2005 | Terlizzi | |
| 2005/0102172 A1 | 5/2005 | Sirmans | |
| 2005/0131742 A1 | 6/2005 | Hoffman et al. | |
| 2005/0222867 A1 | 10/2005 | Underwood | |
| 2005/0222877 A1 | 10/2005 | Radson et al. | |
| 2005/0222878 A1 | 10/2005 | Radson et al. | |
| 2005/0228692 A1 | 10/2005 | Hodgdon | |
| 2005/0234742 A1 | 10/2005 | Hodgdon | |
| 2005/0240449 A1 | 10/2005 | Gore et al. | |
| 2005/0256748 A1 | 11/2005 | Gore et al. | |
| 2005/0288971 A1 | 12/2005 | Cassandra | |
| 2006/0041454 A1 | 2/2006 | Matisonn et al. | |
| 2006/0064320 A1 | 3/2006 | Postrel | |
| 2006/0074801 A1 | 4/2006 | Pollard et al. | |
| 2006/0111944 A1 | 5/2006 | Sirmans | |
| 2006/0129436 A1 | 6/2006 | Short | |
| 2006/0143055 A1 | 6/2006 | Loy | |
| 2006/0143056 A1 | 6/2006 | Taylor | |
| 2006/0218011 A1 | 9/2006 | Walker et al. | |
| 2006/0218023 A1 | 9/2006 | Conrad | |
| 2007/0027726 A1 | 2/2007 | Warren | |
| 2007/0050215 A1 | 3/2007 | Kil | |
| 2007/0050217 A1 | 3/2007 | Holden, Jr. | |
| 2007/0061237 A1 | 3/2007 | Merton | |
| 2007/0094125 A1 | 4/2007 | Izyayev | |
| 2007/0112669 A1 | 5/2007 | Snyder | |
| 2007/0136093 A1 | 6/2007 | Rankin | |
| 2007/0233512 A1 | 10/2007 | Gore | |
| 2008/0005016 A1 | 1/2008 | Uhlmann | |
| 2008/0033751 A1 | 2/2008 | Greene | |
| 2008/0046382 A1 | 2/2008 | Metz | |
| 2008/0071600 A1 | 3/2008 | Johnson | |
| 2008/0082372 A1 | 4/2008 | Burch | |
| 2008/0091471 A1 | 4/2008 | Michon | |
| 2008/0154650 A1 | 6/2008 | Matisonn et al. | |
| 2008/0172214 A1 | 7/2008 | Col | |
| 2008/0189141 A1 | 8/2008 | Gore et al. | |
| 2008/0197185 A1 | 8/2008 | Cronin et al. | |
| 2008/0243558 A1 | 10/2008 | Gupte | |
| 2008/0255979 A1 | 10/2008 | Slutzky et al. | |
| 2008/0262877 A1 | 10/2008 | Hargroder | |
| 2008/0312969 A1 | 12/2008 | Raines | |
| 2009/0024419 A1 | 1/2009 | McClellan | |
| 2009/0024478 A1 | 1/2009 | Dixon | |
| 2009/0037230 A1 | 2/2009 | Tracy | |
| 2009/0076903 A1 | 3/2009 | Schwarzberg et al. | |
| 2009/0105550 A1 | 4/2009 | Rothman | |
| 2009/0150189 A1 | 6/2009 | Barron | |
| 2009/0150192 A1 | 6/2009 | Gore et al. | |
| 2009/0164256 A1 | 6/2009 | Fisher | |
| 2009/0198525 A1 | 8/2009 | Gore et al. | |
| 2009/0204441 A1 | 8/2009 | Read | |
| 2009/0204446 A1 | 8/2009 | Simon | |
| 2009/0204447 A1 | 8/2009 | Tucher | |
| 2009/0240532 A1 | 9/2009 | Gore et al. | |
| 2009/0259497 A1 | 10/2009 | Gore et al. | |
| 2009/0265183 A1 | 10/2009 | Pollard et al. | |
| 2009/0299773 A1 | 12/2009 | Gore et al. | |
| 2009/0299774 A1 | 12/2009 | Gore et al. | |
| 2009/0299775 A1 | 12/2009 | Gore et al. | |
| 2009/0299776 A1 | 12/2009 | Gore et al. | |
| 2009/0307015 A1 | 12/2009 | Gore et al. | |

| | | |
|---|---|---|
| 2010/0023354 A1 | 1/2010 | Gore et al. |
| 2010/0023384 A1 | 1/2010 | Pollard et al. |
| 2010/0049541 A1 | 2/2010 | Pollard et al. |

FOREIGN PATENT DOCUMENTS

| | | |
|---|---|---|
| AU | 2007/257457 | 1/2009 |
| AU | 2007/257458 | 1/2009 |
| AU | 2007/257546 | 1/2009 |
| AU | 2007/298514 | 2/2009 |
| AU | 2007/301521 | 5/2009 |
| CN | 2005/880047059 | 7/2007 |
| EP | 1050821 | 11/2000 |
| IL | 195735 | 12/2008 |
| IL | 195737 | 12/2008 |
| IL | 195738 | 12/2008 |
| WO | 02/47074 | 6/2002 |
| WO | 03/007230 | 1/2003 |
| WO | 2007/141695 | 12/2007 |
| WO | 2007/141696 | 12/2007 |
| WO | 2007/141968 | 12/2007 |
| WO | 2008/035280 | 3/2008 |
| ZA | 98/02005 | 3/1998 |
| ZA | 98/11943 | 12/1998 |
| ZA | 2000/04682 | 9/2000 |
| ZA | 2004/02587 | 4/2004 |
| ZA | 2004/02891 | 4/2004 |
| ZA | 2004/05935 | 7/2004 |
| ZA | 2004/06294 | 8/2004 |
| ZA | 2006/01934 | 3/2006 |
| ZA | 2006/04673 | 6/2006 |
| ZA | 2006/04674 | 6/2006 |
| ZA | 2006/04687 | 6/2006 |
| ZA | 2006/04688 | 6/2006 |
| ZA | 2006/07789 | 9/2006 |
| ZA | 2006/07992 | 9/2006 |
| ZA | 2008-03529 | 4/2008 |
| ZA | 2008/04807 | 6/2008 |
| ZA | 2008/04808 | 6/2008 |
| ZA | 2008/04809 | 6/2008 |
| ZA | 2008/04810 | 6/2008 |
| ZA | 2008/04811 | 6/2008 |
| ZA | 2009/01740 | 3/2009 |

OTHER PUBLICATIONS

U.S. Appl. No. 09/876,311, Response to Office Action Feb. 5, 2009.
U.S. Appl. No. 09/876,311, Response to Office Action May 28, 2009.
U.S. Appl. No. 09/876,311, Response to Office Action Sep. 10, 2009.
U.S. Appl. No. 09/876,311, Response to Office Action May 17, 2010.
U.S. Appl. No. 09/982,274, filed Oct. 17, 2001.
U.S. Appl. No. 09/982,274, Final Rejection Nov. 27, 2006.
U.S. Appl. No. 09/982,274, Final Rejection May 6, 2008.
U.S. Appl. No. 09/982,274, Final Rejection Jun. 9, 2009.
U.S. Appl. No. 09/982,274, Non-Final Rejection Mar. 3, 2006.
U.S. Appl. No. 09/982,274, Non-Final Rejection Aug. 9, 2007.
U.S. Appl. No. 09/982,274, Non-Final Rejection Oct. 17, 2008.
U.S. Appl. No. 09/982,274, Response to Office Action Sep. 6, 2006.
U.S. Appl. No. 09/982,274, Response to Office Action May 29, 2007.
U.S. Appl. No. 09/982,274, Response to Office Action Jan. 22, 2008.
U.S. Appl. No. 09/982,274, Response to Office Action Aug. 6, 2008.
U.S. Appl. No. 09/982,274, Response to Office Action Feb. 17, 2009.
U.S. Appl. No. 09/982,274, Notice of Appeal filed Sep. 9, 2009.
U.S. Appl. No. 09/982,274, Appeal Brief filed Nov. 9, 2009.
U.S. Appl. No. 09/982,274, Reply Brief filed Apr. 2, 2010.
U.S. Appl. No. 12/112,165, filed Apr. 30, 2001.
U.S. Appl. No. 10/251,120, filed Sep. 20, 2002.
U.S. Appl. No. 10/251,120, Final Rejection Dec. 31, 2007.
U.S. Appl. No. 10/251,120, Final Rejection Jun. 25, 2009.
U.S. Appl. No. 10/251,120, Non-Final Rejection Mar. 29, 2007.
U.S. Appl. No. 10/251,120, Non-Final Rejection Jan. 5, 2009.
U.S. Appl. No. 10/251,120, Examiner Summary Oct. 21, 2009.
U.S. Appl. No. 10/251,120, Examiner Summary Jul. 6, 2010.
U.S. Appl. No. 10/251,120, Response to Office Action Sep. 28, 2007.
U.S. Appl. No. 10/251,120, Response to Office Action Oct. 7, 2008.
U.S. Appl. No. 10/251,120, Response to Office Action Apr. 6, 2009.
U.S. Appl. No. 10/251,120, Appeal Brief filed Mar. 24, 2010.
U.S. Appl. No. 11/198,206, filed Aug. 5, 2005.
U.S. Appl. No. 11/198,206, Final Rejection Jan. 23, 2009.
U.S. Appl. No. 11/198,206, Non-Final Rejection Jun. 30, 2008.
U.S. Appl. No. 11/198,206, Response to Office Action Oct. 30, 2008.
U.S. Appl. No. 12/333,465, filed Dec. 12, 2008.
U.S. Appl. No. 12/262,266, filed Oct. 31, 2008.
U.S. Appl. No. 12/303,388, filed Dec. 4, 2008.
U.S. Appl. No. 12/303,391, filed Dec. 4, 2008.
U.S. Appl. No. 12/303,395, filed Dec. 4, 2008.
U.S. Appl. No. 12/303,399, filed Dec. 4, 2008.
U.S. Appl. No. 12/441,447, filed Mar. 16, 2009.
U.S. Appl. No. 10/344,176, filed Aug. 15, 2003.
U.S. Appl. No. 10/344,176, Response to Office Action Mar. 2, 2009.
U.S. Appl. No. 10/344,176, Final Rejection Oct. 30, 2008.
U.S. Appl. No. 10/344,176, Final Rejection Mar. 2, 2010.
U.S. Appl. No. 10/344,176, Non-Final Rejection Dec. 19, 2007.
U.S. Appl. No. 10/344,176, Non-Final Rejection Jun. 8, 2009.
U.S. Appl. No. 10/344,176, Response to Office Action May 19, 2008.
U.S. Appl. No. 10/344,176, Response to Office Action Nov. 9, 2009.
U.S. Appl. No. 11/189,647, filed Jul. 26, 2005.
U.S. Appl. No. 11/189,647, Final Rejection May 11, 2010.
U.S. Appl. No. 11/189,647, Non-Final Rejection Aug. 14, 2009.
U.S. Appl. No. 11/189,647, Response to Office Action Feb. 15, 2010.
U.S. Appl. No. 10/819,256, filed Apr. 6, 2004.
U.S. Appl. No. 10/819,256, Final Rejection Jan. 6, 2009.
U.S. Appl. No. 10/819,256, Non-Final Rejection Mar. 18, 2008.
U.S. Appl. No. 10/819,256, Response to Office Action Sep. 18, 2008.
U.S. Appl. No. 11/097,947, filed Apr. 1, 2006.
U.S. Appl. No. 11/097,947, Non-Final Rejection Nov. 10, 2009.
U.S. Appl. No. 11/097,947, Final Rejection Jun. 7, 2010.
U.S. Appl. No. 11/097,947, Response to Office Action Mar. 10, 2010.
U.S. Appl. No. 10/818,574, filed Apr. 6, 2004.
U.S. Appl. No. 10/818,574, Non-Final Rejection Feb. 4, 2009.
U.S. Appl. No. 10/818,574, Response to Office Action May 4, 2009.
U.S. Appl. No. 11/074,453, filed Mar. 8, 2005.
U.S. Appl. No. 11/074,453, Non-Final Rejection Mar. 4, 2009.
U.S. Appl. No. 11/074,453, Requirement for Election Mar. 31, 2010.
U.S. Appl. No. 11/074,453, Notice of Non-compliant response Nov. 9, 2009.
U.S. Appl. No. 11/074,453, Response to Office Action Apr. 29, 2010.
U.S. Appl. No. 11/074,453, Response to Office Action Nov. 23, 2009.
U.S. Appl. No. 11/074,453, Response to Office Action Jul. 6, 2009.
U.S. Appl. No. 11/794,830, filed Jan. 22, 2008.
U.S. Appl. No. 11/794,830, Final Rejection Dec. 7, 2009.
U.S. Appl. No. 11/794,830, Non-Final Rejection May 27, 2009.
U.S. Appl. No. 11/794,830, Response to Office Action Sep. 28, 2009.
U.S. Appl. No. 11/794,830, Response to Office Action Apr. 7, 2010.
U.S. Appl. No. 11/903,607, filed Sep. 24, 2007.
U.S. Appl. No. 11/903,607, Final Rejection Jan. 28, 2010.
U.S. Appl. No. 11/903,607, Non-Final Rejection May 13, 2009.
U.S. Appl. No. 11/903,607, Response to Office Action Aug. 12, 2009.
U.S. Appl. No. 11/903,607, Response to Office Action Apr. 28, 2010.
U.S. Appl. No. 12/442,549, filed Mar. 24, 2009.
U.S. Appl. No. 12/477,179, filed Jun. 3, 2009.
U.S. Appl. No. 12/477,208, filed Jun. 3, 2009.
U.S. Appl. No. 12/477,213, filed Jun. 3, 2009.
U.S. Appl. No. 12/477,225, filed Jun. 3, 2009.
U.S. Appl. No. 12/477,189, filed Jun. 3, 2009.
U.S. Appl. No. 12/721,619, filed Mar. 11, 2010.
U.S. Appl. No. 11/715,181, filed Mar. 7, 2007.
U.S. Appl. No. 11/715,181, Non-Final Rejection Nov. 3, 2009.
U.S. Appl. No. 11/715,181, Non-Final Rejection May 12, 2010.
U.S. Appl. No. 11/715,181, Response to Office Action Feb. 3, 2010.
U.S. Appl. No. 12/303,395, Non-Final Rejection Jan. 24, 2011.
U.S. Appl. No. 12/112,165, Final Rejection Feb. 10, 2011.
U.S. Appl. No. 12/303,388, Non-Final Office Action mailed Mar. 11, 2011.
International Search Report for PCT/IB05/003842 filed Dec. 21, 2005 (WO2006/072822).
Written Opinion for PCT/IB05/003842 filed Dec. 21, 2005 (WO2006/072822).
International Preliminary Report on Patentability for PCT/IB05/003842 filed Dec. 21, 2005 (WO2006/072822).

International Search Report for PCT/IB07/051945 filed May 23, 2007 (WO2007/141695).
Written Opinion for PCT/IB07/051945 filed May 23, 2007 (WO2007/141695).
International Preliminary Report on Patentability for PCT/IB07/051945 filed May 23, 2007 (WO2007/141695).
International Search Report for PCT/IB07/051946 filed May 23, 2007 (WO2007/141696).
Written Opinion for PCT/IB07/051946 filed May 23, 2007 (WO2007/141696).
International Preliminary Report on Patentability for PCT/IB07/051946 filed May 23, 2007 (WO2007/141696).
International Search Report for PCT/IB07/051947 filed May 23, 2007 (WO2007/141697).
Written Opinion for PCT/IB07/051947 filed May 23, 2007 (WO2007/141697).
International Preliminary Report on Patentability for PCT/IB07/051947 filed May 23, 2007 (WO2007/141697).
International Search Report published Apr. 23, 2009 for PCT/IB07/051948 filed May 23, 2007 (WO2007/141698).
Written Opinion published Mar. 13, 2009 PCT/IB07/051948 filed May 23, 2007 (WO2007/141698).
International Preliminary Report on Patentability published Mar. 17, 2009 for PCT/IB07/051948 filed May 23, 2007 (WO2007/141698).
International Search Report for PCT/IB07/053906 filed Sep. 26, 2007 (WO2008/038232).
Written Opinion for PCT/IB07/053906 filed Sep. 26, 2007 (WO2008/038232).
International Preliminary Report on Patentability for PCT/IB07/053906 filed Sep. 26, 2007 (WO2008/038232).
International Search Report for PCT/IB01/01406 filed Aug. 8, 2001 (WO2002/013438).
International Preliminary Report on Patentability for PCT/IB01/01406 filed Aug. 8, 2001 (WO2002/013438).
International Search Report for PCT/IB2007/053760 filed Sep. 18, 2007 (WO2008/035280).
Written Opinion for PCT/IB2007/053760 filed Sep. 18, 2007 (WO2008/035280).
International Preliminary Report on Patentability for PCT/IB2007/053760 filed Sep. 18, 2007 (WO2008/035280).
U.S. Appl. No. 09/876,311, filed Jun. 7, 2001.
U.S. Appl. No. 09/876,311, Final Rejection Oct. 23, 2006.
U.S. Appl. No. 09/876,311, Final Rejection Dec. 16, 2009.
U.S. Appl. No. 09/876,311, Non-Final Rejection Jan. 17, 2006.
U.S. Appl. No. 09/876,311, Non-Final Rejection Nov. 30, 2007.
U.S. Appl. No. 09/876,311, Non-Final Rejection Jul. 9, 2010.
U.S. Appl. No. 09/876,311, Requirement for Restriction May 18, 2007.
U.S. Appl. No. 09/876,311, Requirement for Restriction Jan. 2, 2009.
U.S. Appl. No. 09/876,311, Requirement for Restriction Jan. 16, 2009.
U.S. Appl. No. 09/876,311, Requirement for Restriction Aug. 10, 2009.
U.S. Appl. No. 09/876,311, Response to Office Action Jul. 19, 2006.
U.S. Appl. No. 09/876,311, Response to Office Action Feb. 23, 2007.
U.S. Appl. No. 09/876,311, Response to Office Action Jul. 17, 2007.
U.S. Appl. No. 09/876,311, Response to Office Action May 29, 2008.
U.S. Appl. No. 09/876,311, Response to Office Action Oct. 15, 2008.
"Sidelines" WWD, p. 10—STIC Scientific and Technical Information Center, Feb. 3, 2000.
U.S. Appl. No. 12/477,225, Non-final Office Action Mar. 25, 2011.
U.S. Appl. No. 12/333,465, Non-final Office Action Mar. 30, 2011.
U.S. Appl. No. 12/303,395, Non-Final Rejection Apr. 29, 2011.
U.S. Appl. No. 12/303,391, Final Office Action May 11, 2011.
U.S. Appl. No. 12/333,465, Response filed Jun. 30, 2011.
Andrew Cohen; Putting Wellness to work; date Mar. 1, 1997; Athletic Business, pp. 1-7.
www.netpulse.net; Netpulsue Makes Working Out More than a Calorie-Burning Session; date Mar. 21, 1998, pp. 1-2.
www.netpulse.net; 24 Hour Fitness Partners with Netpulse; date Mar. 9, 1998; p. 1.
Trends in Medical Benefit Plan Design to Control Claim Costs; Record of Society of Actuaries; date 1982; vol. 8, No. 2, pp. 515-531.
David Richards, Return of Premium Disability Insurance; The Black Hole, dated Jul. 15, 2010, p. 1-4.
Co-pending U.S. Appl. No. 11/074,453, Final Office Action mailed Jul. 19, 2010.
Co-pending U.S. Appl. No. 11/189,647, Request for Continued Examination filed Jul. 19, 2010.
Co-pending U.S. Appl. No. 11/715,181, Response filed Aug. 12, 2010.
Co-pending U.S. Appl. No. 12/112,165, Non-final Office Action mailed Sep. 2, 2010.
Co-pending U.S. Appl. No. 10/251,120, Request for Continued Examination filed Oct. 6, 2010.
Co-pending U.S. Appl. No. 12/303,391, Non final Office Action mailed Nov. 24, 2010.
Co-pending U.S. Appl. No. 11/074,453, Response to final office action Dec. 20, 2010.
Co-pending U.S. Appl. No. 09/876,311, Non-final Office Action mailed Jul. 9, 2010.
U.S. Appl. No. 12/112,165, Final Office Action Feb. 10, 2011.
U.S. Appl. No. 12/112,165, Non Final Office Action mailed Sep. 2, 2010.
U.S. Appl. No. 12/112,165, RCE Response filed May 11, 2011.
U.S. Appl. No. 12/912,040, filed Oct. 26, 2010.
U.S. Appl. No. 12/333,465, Non-final Rejection mailed Mar. 30, 2011.
U.S. Appl. No. 12/333,465,Response filed Jun. 30, 2011.
U.S. Appl. No. 12/333,465 Final Office Action Oct. 4, 2011.
U.S. Appl. No. 12/303,388 Non-final Office Action Mar. 11, 2011.
U.S. Appl. No. 12/303,388 Response Jun. 8, 2011.
U.S. Appl. No. 12/303,388 Final Office Action Jul. 5, 2011.
U.S. Appl. No. 12/303,388 Response Sep. 2, 2011.
U.S. Appl. No. 12/303,391 non Final Office Action Nov. 24, 2010.
U.S. Appl. No. 12/303,391 Final Office Action May 11, 2011.
U.S. Appl. No. 12/303,391 RCE response Aug. 11, 2011.
U.S. Appl. No. 12/303,395 Non-Final Rejection Jan. 24, 2011.
U.S. Appl. No. 12/303,395 Response filed Apr. 29, 2011.
U.S. Appl. No. 12/303,395 Final Office Action Jun. 13, 2011.
U.S. Appl. No. 12/441,447, Non Final Office Action Aug. 1, 2011.
U.S. Appl. No. 12/441,447, Response filed Nov. 1, 2011.
U.S. Appl. No. 10/344,176, Office Action May 16, 2011.
U.S. Appl. No. 11/189,647, Response to office action Apr. 18, 2011.
U.S. Appl. No. 11/189,647, Final Office Action Jun. 22, 2011.
U.S. Appl. No. 11/189,647, Response Aug. 12, 2011.
U.S. Appl. No. 11/074,453, Response to final office action Dec. 20, 2010.
U.S. Appl. No. 11/074,453, Requirement for Election May 23, 2011.
U.S. Appl. No. 11/074,453, Office Action Oct. 11, 2011.
U.S. Appl. No. 11/794,830, Non-Final Rejection Dec. 19, 2011.
U.S. Appl. No. 11/715,181, Response to Office Action Mar. 11, 2011.
U.S. Appl. No. 11/903,607, Office Action Nov. 30, 2011.
U.S. Appl. No. 12/442,549 non Final Office Action Sep. 19, 2011.
U.S. Appl. No. 12/477,179, Non final office action Jul. 22, 2011.
U.S. Appl. No. 12/477,179, Response filed Oct. 24, 2011.
U.S. Appl. No. 12/477,208, Non final office action Jul. 22, 2011.
U.S. Appl. No. 12/477,213 Non final office action Aug. 9, 2011.
U.S. Appl. No. 12/477,225, Non-final Office Action May 25, 2011.
U.S. Appl. No. 12/477,225, Non Final Office Action Jul. 8, 2011.
U.S. Appl. No. 12/477,225, Final Office Action Sep. 28, 2011.
U.S. Appl. No. 12/477,189 non final Office Action Aug. 5, 2011.
U.S. Appl. No. 12/477,189 Preliminary Amendment filed Nov. 4, 2011.
U.S. Appl. No. 12/477,189 Final Office Action Dec. 5, 2011.
U.S. Appl. No. 12/721,619, Preliminary Amendment filed Nov. 3, 2011.
U.S. Appl. No. 12/912,009, filed Oct. 26, 2010.
U.S. Appl. No. 12/912,009 Non-final Office Action Dec. 19, 2011.
U.S. Appl. No. 12/912,040, Office Action Oct. 20, 2011.
Discovery Life "The Discovery life Portfolio", 62 pgs—2008.
AFLAC "Personal Disability Income Protector", 6 pgs—Jul. 2003.
R.C. Olmstead, "Our Products" May 2008.
Discovery Life—"Why Discovery Life"—4 pgs—May 29, 2008.
GE Group Life Assurance Company—Group Short Term Disability Insurance—18 pgs, Oct. 29, 2004.

Wenfin Financial Services, "Discovery Life Plan" www.bmlink.co.za/WenFininsurance—Website download, 58 pgs, Aug. 5, 2011.
EconEdLink—"How Long is Your life?"—Tutorial from EconEdLink.com web-site, 4 pgs, posted Sep. 13, 2004.
AFLAC—"Personal Cancer Indemnity Plan" Level 3, 11 pgs, Jun. 2005.
Gendell Murray, "Retirement age Declines again in 1990s", Monthly Labor Review, 10 pgs, Oct. 2001.
Discovery Life "Benefit version Reference Guide" Oct. 2008.
Discovery Life—"Discovery life Group Risk Life Plan".
WenfinWebPages for Discovery Life Nov. 13, 2006.
AFLAC—Discovery Life "Application for Discovery Card Protector" Nov. 2007.
Discovery Life "The Disovery Life Portfolio" Nov. 20, 2008.
Discovery Life "Discovery Individual LIE PLAN Guide" Aug. 4, 2009 EconEdLink—How Long is Your life?—Tutorial from EconEdLink.com web-site, posted Sep. 13, 2004.
Discovery Life "The Discovery Life Portfolio" Jun. 2008.
Discovery Invest Group Retirement {Plan Financial Solutions for employees: Oct. 17, 2009.
ATG Customer Success Story: Discovery Heathly 2006 ART Tech Group, Inc.
Discovery Vitality; Discovery Vitality 2009 Sep. 12, 2008.
Discovery Invest, Group Retirement Plan Finanical solutions for employees Jan. 17, 2009.
Baker et al. Pay for Performance Incentive Programs in Healthcare; Market Dynammics and Business Process-Research Report 2003.
PruHealth, Individual Policy Document Jul. 2008.
Discovery Vitality, Lesson Plans Grade 4 nad 5 Apr. 2, 2008.
HLC Financial Services, Discovery News Feb. 2009.
The Discovery Life, "Technical guide for financial advisers" Nov. 2008.
Rintelman, Mary Jane, "Choice and cost-savings", Credit Union Management, vol. 19, No. 7, pp. 48, 50. Jul. 1996.
Woodard, Kathy, "stay healthy for real fun—and profit", Business First Columbus, vol. 12, No. 19, S.1, p. 13. Jan. 1996.
Spencer, Peter L., "New plan cuts health car costs in half (advantage of health care plan with high deductible)", Consumers' Research Magazine, vol. 76, No. 10, pp. 16. Oct. 1993.
Commmunity Hearth Health Programs: Components, Ratio: John P. Elder, Thomas L. Schmid, Phyillis Dower and Sonja Hedlund; Journal of Public Health Policy; Palgrave Macmillian; 1993 winter; pp. 463-479.
Ferling ("New plans, New policies," Ferling, Rhona. Best's Review; Apr. 1993 p. 78).
"Plan Highlights for El Paso ISD" Salary Protection Insurance Plan, web-site—http://w3.unumprovident.com/enroll/elpasoisd/your_plan.htm, Mar. 3, 2008.
Consumer-Driven Health Plans Catch on as Myths Fall by Wayside (Sep. 4). PR Newswire, 1.
Art Technology Group; Discovery Holdings to exploit online interest in healthcare and life assurance with ATG commerce functionality; Revenue potential significant as 70% of Discovery members access the internet. (Oct. 28), M2 Presswire, 1.
"Absenteeism Control"; Cole, Thomas C. et al; Management Decision; London: 1992. vol. 20, Iss. 2; p. 12 (AC).
Saleem, Haneefa: "Health Spending Accounts"; Dec. 19, 2003; posted online at http://www.bls.gov/opub/cwc/print/cm20031022ar01p1.htm.
Insure.com; "The lowdown on life insurance medical exams"; Jun. 28, 2006; Imaged from the Internet Archive Waybackmachine on May 10, 2006 at http://web.archive.org/web/20060628231712/http://articles.moneycentral.msn.com/Insurance/Insureyourlife/thelowdownonlifeinsurancwemedicalexams.aspx.
definition of insurance, New Penguin Business Dictionary, Retreieved Oct. 26, 2008 from http://www.credoreference.com/entry/6892512/.
Gore, The case for Consumer Engagement in the funding of Healthcare IAAHS 2007.
Preferred Health Systems—Preferred News—vol. 9, issue 1, Spring 2008.
Discovery Why Discovery Life May 29, 2008.
BX Link Your Company Websites Discovery Life Plans Jan. 13, 2003.
Destiny Health Individual Brochure Health Coverage modified Oct. 18, 2006.
DaSilva Roseanne The Impact of Wellness Activities on Hospital Claims Experience, Joint Colloquium of the IACA, PBSS and IAAHS May 2008 Oct. 1, 2004.
M. Doty et al., Issue Brief, Maintaining Health Insurance During a Recession, 6 pgs, 2001.
R. Merhr, ARIA—The Concept of the Level—Premium Whole Life Insurance Policy, The Journal of Risk and Insurance, vol. 42, No. 3 (Sept 1975) pp. 419-431.
STIC Search Report EIC 3600, Scientific and Technical Information Center, 63 pgs.
Web-site Google Search Google Employee Wellness Payment dated Feb. 12, 2012.
Wellness Source—How Much Does a Good Wellness Program Cost? 2 pgs.
South African Patent Journal No. 6 of 1 , Jun. 2099, vol. 42, p. 229.
South African Patent Application 2008/04810 filed Jun. 26, 2009—Annotated with Paragragh numbers.
South African Patents Act, No. 57 of 1978 as amended by Patents Amendment Act No. 58 of 2002.
Discovery Life, "Technical guide for financial advisers" Nov. 11, 2009.
U.S. Appl. No. 13/638,608, filed Sep. 30, 2012.
U.S. Appl. No. 13/648,309, filed Oct. 10, 2012.
U.S. Appl. No. 13/641,143, filed Oct. 15, 2012.
U.S. Appl. No. 13/641,145, filed Oct. 15, 2012.
U.S. Appl. No. 13/641,155, filed Oct. 15, 2012.
U.S. Appl. No. 12/912,009 Response filed Aug. 31, 2012.

* cited by examiner

Employer A

| Wellness Program ID | Health Plan ID | Employee ID | Employee Name | Wellness Program Status Level | Wellness Payroll Adjustment | ... |
|---|---|---|---|---|---|---|
| WP1 | HP1 | E_1 | John A | Bronze | WP_A | ... |
| | | E_2 | Sheryl B | Platinum | WP_D | ... |
| | | E_3 | Tim C | Blue | Null | ... |
| | | E_4 | Jane D | Grace Period | Null | ... |
| | | E_6 | Michael F | Silver | WP_B | |
| | | E_N | Jim G | Gold | WP_C | ... |
| ... | | | | | | |

| Employee ID | Employee Name | Employee Address | Payroll Information | Wellness Program enrollment | ... |
|---|---|---|---|---|---|
| EMP_1 | John A... | 123 ABC Lane | PG_1 | Y | ... |
| EMP_2 | Sheryl B... | 234 DEF Blvd. | PG_1 | Y | ... |
| EMP_3 | Tim C... | 345 GHI Cir. | PG_N | Y | ... |
| EMP_4 | Jane D... | 456 JKL Court. | PG_1 | Y | ... |
| EMP_5 | Lisa E... | 567 MNO Ave. | PG_1 | N | ... |
| EMP_6 | Michael F... | 678 PQR Place | PG_N | Y | ... |
| ... | ... | ... | ... | ... | ... |
| EMP_N | Jim G... | 789 STU St. | PG_N | Y | ... |

FIG. 4

| User ID 502 | User Name 506 | Date 510 | Time 514 | 148 |
|---|---|---|---|---|
| User_1 504 | John A. 508 | 01/01/2008 01/03/2008 512 ... | 8:00 am 5:15pm ... | 516 |
| User_2 | Sheryl B. | 01/02/2008 01/03/2008 01/04/2008 01/05/2008 ... | 8:00 am 5:15pm 8:02 am 5:20pm ... | |
| ... | ... | | | |
| User_N | Jim G. | 01/09/2008 01/21/2008 01/22/2008 ... | 8:00 am 5:15pm 5:15pm ... | |
| ... | ... | | | ... |

Employee Usage Information

FIG. 5

Employee E_2

| Date 604 | Facility/Service ID 608 | Points 612 | |
|---|---|---|---|
| 01/02/2008 | F_1 | 500 | ... |
| 01/03/2008 | F_1 | 500 | ... |
| 01/04/2008 | F_1 | 500 | ... |
| 01/05/2008 | F_1 | 500 | ... |
| 01/06/2008 | S_1 | 1500 | ... |
| ... | ... | ... | ... |

Employer A

| Employee ID 806 | Employee Name 810 | Employee Address 814 | Current Payroll Information 816 | Employee Contribution 820 | Wellness Program Status 818 | Payroll Adjustment Amount 822 | 826 |
|---|---|---|---|---|---|---|---|
| EMP_1 804 | John A. 808 | 123 ABC Lane 812 | $3000 | $125 820 | Bronze 824 | WP_A 828 | ... |
| EMP_2 | Sheryl B. | 234 DEF Blvd. | $3000 | $125 | Platinum | WP_D | ... |
| EMP_3 | Tim C. | 345 GHI Cir. | $4000 | $75 | Blue | Null | ... |
| EMP_4 | Jane D. | 456 JKL Court. | $2000 | $100 | Grace Period | Null | ... |
| EMP_5 | Lisa E. | 567 MNO Ave. | $2500 | $200 | N/A | N/A | ... |
| EMP_6 | Michael F. | 678 PQR Place | $3000 | $0 | Silver | WP_B | ... |
| ... | ... | ... | ... | ... | ... | ... | ... |
| EMP_N | Jim G. | 789 STU St. | $3500 | $125 | Gold | WP_C | ... |
| ... | ... | ... | ... | ... | ... | ... | ... |

136 ated with the at least one employee is created. The data
WELLNESS PROGRAM MANAGEMENT AND INTEGRATION WITH PAYROLL VENDOR SYSTEMS

CROSS REFERENCE TO RELATED APPLICATIONS

This application is a continuation-in-part of U.S. patent application Ser. No. 12/112,165 filed Apr. 30, 2008, which is a continuation of U.S. patent application Ser. No. 09/982,274 filed on Oct. 17, 2001 now U.S. Pat. No. 8,131,570 which is a continuation-in-part application of U.S. application Ser. No. 09/265,240 filed Mar. 9, 1999 now abandoned, each application is hereby incorporated by reference in its entirety.

FIELD OF THE INVENTION

The present invention generally relates to the field of wellness programs, and more particularly relates to managing wellness programs and participant usage of wellness programs.

BACKGROUND OF THE INVENTION

Conventional health plans, in general, do not effectively encourage their members to minimize their medical expenses or to adopt a healthy lifestyle. Instead, members often attempt to draw the maximum possible benefits from their health plan, based on their view that their contributions to the plan will otherwise be "wasted". One approach, which has been adopted in an attempt to address this syndrome, is the introduction of savings plans, in terms of which members claim benefits at a lower rate than normal and accrue funds in a savings account.

In many instances, a health plan is offered by an employer to its employees. An employer may also offer wellness programs to its employees in conjunction with a health plan. Wellness programs provide facilities, services, and anything else that promotes a healthier lifestyle. However most wellness programs are not associated with an incentive program to effectively encourage participants such as employees to fully utilize the programs. Also, most wellness programs are not integrated with payroll systems so that contribution adjustments, discounts, and/or rebates can be given to an employee based on wellness program participation.

Therefore, a need exists to overcome the problems with the prior art as discussed above.

SUMMARY OF THE INVENTION

In one embodiment, a computer implemented method is disclosed. The computer implemented method includes receiving employee usage information associated with at least one employee's usage of a wellness program. A status level associated with the at least one employee for the wellness program is determined based on the employee usage information. A status level indicates a degree of participation in the wellness program. A data set is created comprising at least the status level associated with the at least one employee. The data set is in a format acceptable by a payroll vendor without conversion of the data set. The file is then sent to an employer of the at least one employee.

In another embodiment, an information processing system for managing a wellness program is disclosed. The information processing system includes a memory and a processor that is communicatively coupled to the memory. The information processing system also includes a wellness program manager that is communicatively coupled to the memory and the processor. The wellness program manager is adapted to receive employee usage information associated with at least one employee's usage of a wellness program. The employee usage information includes information associated with a plurality of separate and distinct occurrences of wellness program participation by the at least one employee. A status level associated with the at least one employee is determined for the wellness program based on the employee usage information. A status level indicates a degree of participation in the wellness program. A data set including at least the status level associ set is in a format acceptable by a payroll vendor without conversion of the data set. The data set is sent to an employer of the at least one employee.

In yet another embodiment, a computer implemented method for managing a wellness program is disclosed. The computer implemented method includes receiving employee usage information associated with at least one employee's usage of a wellness program. A payroll data set associated with the at least one employee is received. A status level associated with the at least one employee for the wellness program is determined based on the employee usage information. A status level indicates a degree of participation in the wellness program. A payroll adjustment amount is determined based on the status level associated with the at least one employee. The payroll data set is updated with at least the status level and payroll adjustment amount. The payroll data is sent to an employer of the at least one employee.

An advantage of the various embodiments of the present invention is that an alternative and/or additional method of managing the use of a health plan, which may be thought of in terms of a traditional indemnity health insurance plan, is provided. Another advantage is that a wellness program is provided and managed such that participants are effectively encouraged to participate in the program. For example an employee's contribution to a health insurance plan can be reduced based on the employee's participation in the wellness program. Employee's can also be given a rebate, discount, or the like based on participation in the wellness program. The various embodiments configure a wellness program for standalone integration into payroll systems.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

FIG. 3 illustrates one example of a wellness program member record comprising user information according to one embodiment of the present invention;

FIG. 4 illustrates one example of an employee information record maintained by an employer according to one embodiment of the present invention;

FIG. 5 illustrates one example of a user participation record according to one embodiment of the present invention;

FIG. 6 illustrates one example of an employee information record maintained either by an employer or a wellness program provider according to one embodiment of the present invention;

FIG. 8 illustrates one example of a payroll record according to one embodiment of the present invention;

DETAILED DESCRIPTION

The various embodiments of the present invention provide incentives for health plan members to minimize medical expenses both by responsible use of the benefits of the plan, and also by offering positive incentives to members to adopt a healthy lifestyle and to make use of preventative procedures and pre-treatment medical advice facilities. Another advantage is that wellness programs are offered to members of the health plans or individuals in general.

Wellness plans promote healthier lifestyles and in return can potentially help reduce injuries and health related problems. This, in turn, can help reduce costs experienced by employers who offer health plans to their employees. For example, if employees are participating in wellness programs and have healthier lifestyles, then the chances of an employee utilizing the health plan is reduced. Therefore the premiums paid by the employers can also be reduced. Yet another advantage of the various embodiments is that incentives can be offered to employees or other participants of a wellness program to effectively utilize the wellness plan. For example, employees' health contribution can be reduced based on the employee's utilization of the wellness program. Other rebates and/or discounts can be given as well.

As required, detailed embodiments of the present invention are disclosed herein; however, it is to be understood that the disclosed embodiments are merely examples of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically.

General Operating Environment

Figure 1:
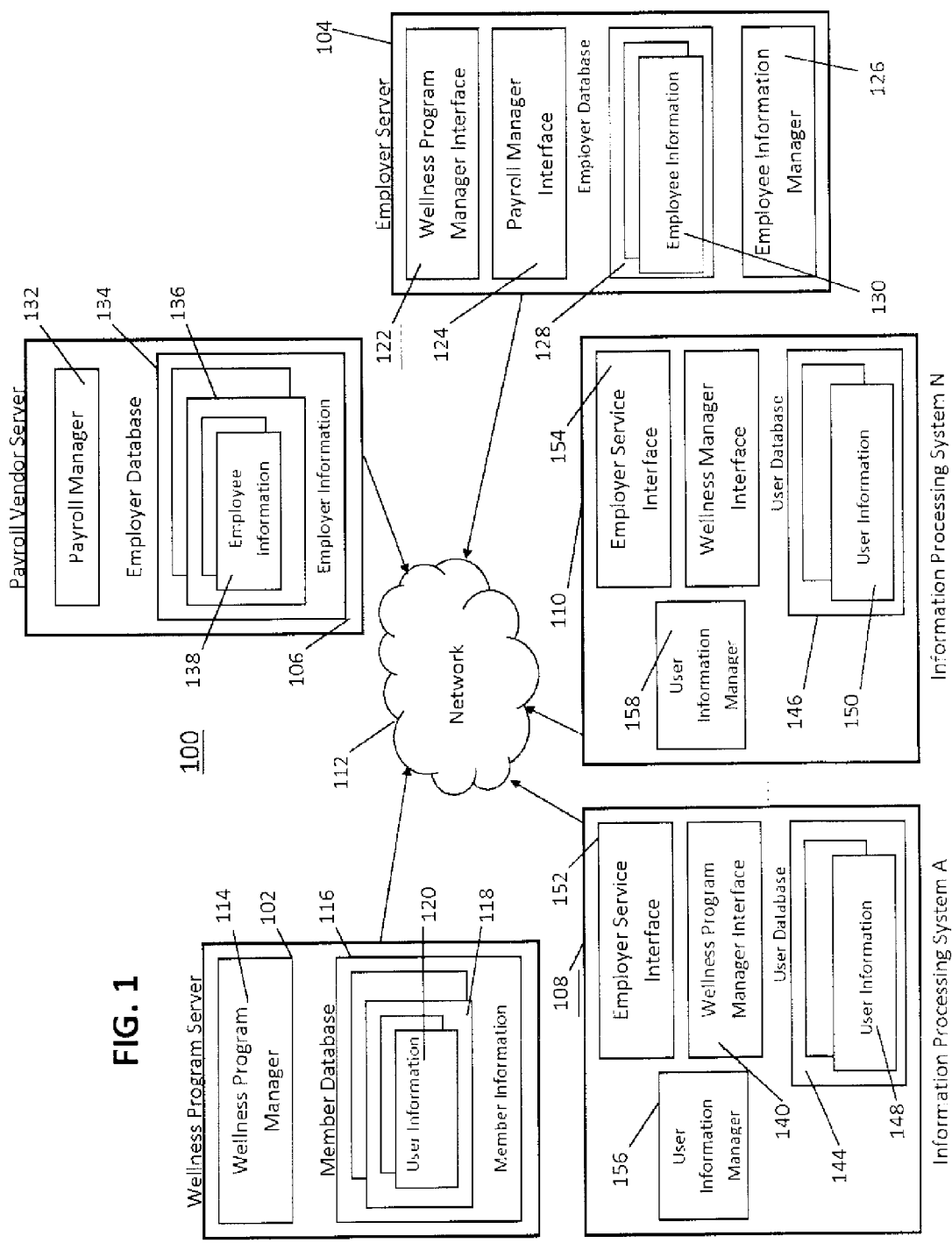
FIG. 1 is a block diagram illustrating a general overview of an operating environment according to one embodiment of the present invention.

According to one embodiment of the present invention as shown in FIG. 1 a general overview of an operating environment 100 is illustrated. In particular, the operating environment 100 includes one or more information processing systems 102, 104, 106, 108, 110 communicatively coupled to each other through one or more networks 112. The one or more networks 112 can include wired and/or wireless technologies.

In one embodiment, one of the information processing systems 102 is a server associated with a first business entity that maintains and provides one or more wellness programs to other business entities. It should be noted that the first business entity is not required to own the wellness program. For example, another business entity can own and provide the wellness program to other companies and individuals. This business entity can have the company associated with the information processing system 102 manage and maintain the wellness program. The information processing system 102 from herein on is referred to as the "wellness program server 102".

The information processing system 104, in this embodiment, is associated with a second business entity that subscribes to the wellness program(s) provided by the first business entity. The second business entity offers the wellness program to its employees. The information processing system 104 from hereon in is referred to as the "employer server 104". The information processing system 106 is associated with a third business entity such as a payroll vendor that the second business entity utilizes for its payroll needs. The information processing system 106 from hereon in is referred to as the "payroll server". The other information processing systems 108, 110 shown are associated with a respective business entity that provides a facility, service, program or the like that can be used with as part of a wellness program.

It should be noted that the information processing systems 102, 104, 106, 108, 110 can be owned, operated, and maintained by each their respective business entities or can be maintained and operated by one or more hosting companies. Also, one or more information processing systems (not shown) can reside within the operating environment 100. For example, one or more information processing systems associated with a business entity that provides and maintains health plans such as (but not limited to) medical, dental, vision, and behavioral health plans can reside within the operating environment 100. Alternatively, the first business entity that provides and manages wellness programs can also offer health plans as well. Although FIG. 1 shows the information processing system 104 being associated with an employer offering a wellness program to its employees, the information processing system 104 can be associated any other business entity that offers a wellness program to individuals.

The wellness program server 102, in one embodiment, includes a wellness program manager 114 and one or more databases 116. The one or more databases 116, in one embodiment, include member information or member record 118 and user information 120. Member information 118 is associated with each member of a wellness program such as employers. User information 120 is associated with users of a wellness program such as the employees of a member (e.g., employer) or family members of the employees. The wellness program manager 114 manages wellness programs provided by the one or more business entities associated with the wellness program server 102 and also maintains and manages member/user information 118, 120 as well.

The employer server 104, in one embodiment, includes a wellness program manager interface 122, a payroll manager interface 124, an employee information manager 126, and a one or more databases 128. The one or more databases 128 include employee information 130 such as (but not limited to)

wellness program participation information, wellness program status level, and the like. The wellness program manager interface 122 allows an automated agent and/or a user such as an administrator to communicate with the wellness program server 102.

In other words, the wellness program manager interface 122 enables the automated agent and/or a human user to interact with the wellness program manger 114. The wellness program manager interface 122 allows employee information 130 such as information related to wellness program participation, payroll information, and other types of information to be transmitted to the wellness program manger 114 for storage and analysis. The payroll manager interface 124 enables an automated agent and/or a human user to interact with the payroll manager 132 at the payroll server 106. The automated agent and/or human user can communicate employee payroll information and/or wellness program information associated with an employee for creating a payroll for the employee. The employee information manager 126 manages and maintains the employee information 130 such as information related to wellness program participation and status levels, and employee payroll information.

The payroll vendor server 106, in one embodiment, includes a payroll manager 132 and one or more databases 134. The one or more databases 134 include employer information 136 for each employer that utilizes the payroll vendor's services and employee information 138 for each employee of the employers. Each of the other information processing systems 108, 110, in one embodiment, include wellness program manager interfaces 140, 142, one or more databases 144, 146, employer server interfaces 152, 154, and user information managers 156, 158.

The one or more databases 144, 146 include user/participant information 148, 150 for each participant (e.g., an employee or family member of an employee) of a wellness program. For example, as discussed above, each of the information processing systems 108, 110, are associated with one or more business entities that provide a facility such as (but not limited to) a health club, hospital, outpatient center or a service such as (but not limited to) nutritional services and support groups.

These facilities/services/programs can be part of a wellness program provided by the business entity associated with the wellness program server 102 and offered to employees by an employer associated with the employer server 104. An individual's (e.g. employee's) utilization of a facility and/or service is maintained by the business entity associated with these facilities/services via the database(s) 144, 146. The user information 148, 150 within these databases 144, 146 reflects an individual's participation/utilization of these wellness related facilities, services, and/or programs.

Each of the wellness program server 102, employer server 104, payroll vendor server 106, information processing systems 108, 110, and their respective components are discussed in greater detail below. It should be noted that present invention is not limited to an employer offering a wellness program(s) to its employees. For example, the present invention is also applicable to individuals subscribing to wellness programs on their own as well. It should also be noted that one or more of the components of the information processing systems 102, 104, 106, 108, 110 can be distributed across multiple systems.

Computing System

Figure 2:
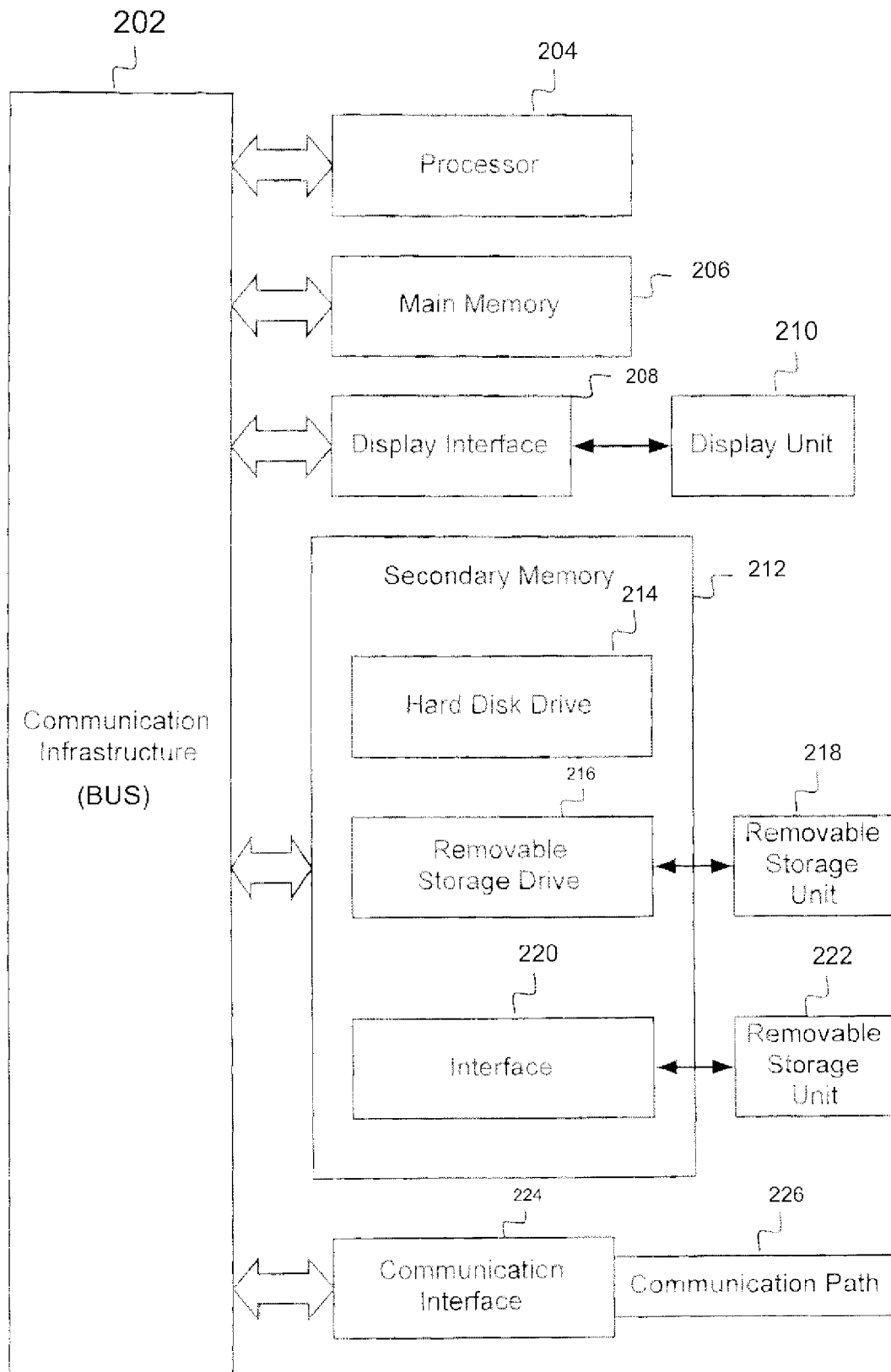
FIG. 2 is a block diagram illustrating a detailed view of an information processing system according to one embodiment of the present invention.

FIG. 2 is a high level block diagram illustrating a more detailed view of a computing system 200 such as any of the information processing systems 102, 104, 106 useful for implementing the wellness program manger 114 according to the various embodiments of the present invention. It should be noted that although the following discussion with respect to FIG. 2 is directed towards the wellness program server 102, the following discussion is also applicable to the employer server 104, payroll vendor server 106, and the other information processing systems 108, 110 as well.

The computing system 200 is based upon a suitably configured processing system adapted to implement an exemplary embodiment of the present invention. For example, a personal computer, workstation, or the like, may be used. In one embodiment of the present invention, the computing system 200 includes one or more processors, such as processor 204. The processor 204 is connected to a communication infrastructure 202 (e.g., a communications bus, crossover bar, or network). Various software embodiments are described in terms of this exemplary computer system. After reading this description, it becomes apparent to a person of ordinary skill in the relevant art(s) how to implement the invention using other computer systems and/or computer architectures.

The computing system 200 can include a display interface 208 that forwards graphics, text, and other data from the communication infrastructure 202 (or from a frame buffer) for display on the display unit 210. The computing system 400 also includes a main memory 206, preferably random access memory (RAM), and may also include a secondary memory 212 as well as various caches and auxiliary memory as are normally found in computer systems. The secondary memory 212 may include, for example, a hard disk drive 214 and/or a removable storage drive 216, representing a floppy disk drive, a magnetic tape drive, an optical disk drive, and the like. The removable storage drive 216 reads from and/or writes to a removable storage unit 218 in a manner well known to those having ordinary skill in the art.

Removable storage unit 218, represents a floppy disk, a compact disc, magnetic tape, optical disk, etc. which is read by and written to by removable storage drive 216. As are appreciated, the removable storage unit 218 includes a computer readable medium having stored therein computer software and/or data. The computer readable medium may include non-volatile memory, such as ROM, Flash memory, Disk drive memory, CD-ROM, and other permanent storage. Additionally, a computer medium may include, for example, volatile storage such as RAM, buffers, cache memory, and network circuits. Furthermore, the computer readable medium may comprise computer readable information in a transitory state medium such as a network link and/or a network interface, including a wired network or a wireless network that allow a computer to read such computer-readable information.

In alternative embodiments, the secondary memory 212 may include other similar means for allowing computer programs or other instructions to be loaded into the computing system 200. Such means may include, for example, a removable storage unit 222 and an interface 220. Examples of such may include a program cartridge and cartridge interface (such as that found in video game devices), a removable memory chip (such as an EPROM, or PROM) and associated socket, and other removable storage units 222 and interfaces 220 which allow software and data to be transferred from the removable storage unit 222 to the computing system 200.

The computing system 200, in this example, includes a communications interface 224 that acts as an input and output and allows software and data to be transferred between the computing system 200 and external devices or access points via a communications path 226. Examples of communications interface 224 may include a modem, a network interface (such as an Ethernet card), a communications port, a PCM- CIA slot and card, etc. Software and data transferred via communications interface 224 are in the form of signals which may be, for example, electronic, electromagnetic, optical, or other signals capable of being received by communications interface 224. The signals are provided to communications interface 224 via a communications path (i.e., channel) 226. The channel 226 carries signals and may be implemented using wire or cable, fiber optics, a phone line, a cellular phone link, an RF link, and/or other communications channels.

In this document, the terms "computer program medium," "computer usable medium," "computer readable medium", "computer readable storage product", and "computer program storage product" are used to generally refer to media such as main memory 206 and secondary memory 212, removable storage drive 216, and a hard disk installed in hard disk drive 214. The computer program products are means for providing software to the computer system. The computer readable medium allows the computer system to read data, instructions, messages or message packets, and other computer readable information from the computer readable medium.

Computer programs (also called computer control logic) are stored in main memory 406 and/or secondary memory 212. Computer programs may also be received via communications interface 224. Such computer programs, when executed, enable the computer system to perform the features of the various embodiments of the present invention as discussed herein. In particular, the computer programs, when executed, enable the processor 204 to perform the features of the computer system.

Wellness Program Integration

The following is a more detailed discussion regarding providing a wellness program to members such as employers and managing user (e.g., employees) participation in the wellness program. In one embodiment, a first business entity maintains, manages, and provides wellness programs to other business entities or individuals. It should be noted that although the following discussion refers to a wellness program by itself, a wellness program can be integrated with a health plan or provided in conjunction with a health plan.

In particular, a second business entity referred to from hereon in as "employer" becomes a member of the wellness plan offered by the first entity. The employer can give each employee the option to participate in the wellness program, provide the wellness program to a given number of employees, or automatically enroll all employees in the wellness program.

The wellness program manager 114 at the wellness program server 102 receives the employer enrollment information from the employer via the wellness program manager interface 122. The wellness program manager interface 122 can be a web-based interface, a telephone, or the like. The employer can also mail employer/employee enrollment information to the first business entity as well. One or more records 118 are created for each employer enrolled in a wellness program and stored in the member database 116. Employee (e.g. user) information 120 is stored within each corresponding employer record 118.

FIG. 3 shows one example of a member record 118. For example, FIG. 3 shows a record 118 for Employer A. The record 118 includes a "Wellness Program ID" column 302 that includes entries 304 with a unique wellness program ID such as "WP1". The wellness program ID uniquely identifies each wellness program that Employer A has enrolled in. The record 118 also includes an optional "Health Plan ID" column 306. This column 306 includes entries 308 with a unique health plan identifier such as "HP 2". The health plan identifier uniquely identifies a health plan that Employer A is a member of. The "Health Plan ID" column 306 is optional because the wellness program can be offered without a health plan, in addition to a health plan, or as part of a health plan.

An "Employee ID" column 310 includes entries 312 with a unique employee identifier such as "E_1". These identifiers uniquely identify each employee of Employer A that is enrolled in the corresponding wellness program such as Wellness Program "WP1". An "Employee Name" column 314 includes entries 316 that include the name of an employee associated with the corresponding employee ID. For example, "John A" is associated with employee ID "E_1". In addition to employee information, the record 118 can also identify dependents of the employees that are also enrolled in a wellness program. The record 118 further includes a "Wellness Program Status Level" column 318. This column 318 includes entries 320 that identify a current wellness program status such as "Bronze" associated with a particular individual. Wellness program status levels are discussed in greater detail below.

A "Wellness Payroll Adjustment" column 322 is also included in the record 118. This column 322 includes entries 324 that indicate a given payroll adjustment amount such as "WP_A" or category that applies to a particular employee. In one embodiment, the payroll adjustment is based on the wellness program status level associated with an employee. In another embodiment a single payroll adjustment amount can be used for each employee regardless of wellness status level. The wellness payroll adjustment is discussed in greater detail below. It should be noted that the present invention is not limited to the particular columns and entries shown in FIG. 3. One of more columns can be added to and/or deleted from the record 118.

As discussed above, an employer maintains employee information 130. FIG. 4 shows one example of an employee information record 130 maintained by the employer (e.g., Employer A). It should be noted that although FIG. 4 shows one record comprising information for all employees, a single record can be created for each employee as well. The employee information record 130, in one embodiment, includes an "Employee ID" column 402. This column 402 includes entries with employee identifiers such as "EMP_1" that uniquely identify each employee to the wellness program manager 114 and/or the payroll manager. An "Employee Name" column 406 includes entries 408 that include the name of each employee. For example, FIG. 4 shows that "John A" is associated with the employee ID "EMP_1".

An "Employee Address" column 410 includes entries 412 with the address of each employee. The employee information record 130 also includes a "Payroll Information" column 414 that includes entries 416 with payroll information such as current payroll amount, deductions, tax information, and the like. In one embodiment, the "Payroll Information" column 414 includes payroll group information such as "PG_1" that indicate a payroll group for each employee. The wellness program manager 114, in one embodiment, uses the payroll group information to determine a payroll schedule for the employee. Payroll schedule information indicates, among other things, when the payroll adjustment information is to be transmitted to the payroll vendor system 106. Additional columns can be added to the employee information record 130 that include further details regarding a payroll schedule or the wellness program server 102 can include a separate record (not shown) for each payroll schedule. Also, the member records 118 and/or the employee records at the employer server 104 can also include the payroll information discussed above.

Examples of payroll schedule information are pay data information that indicates the date of the check (or direct deposit) for a specific pay period; schedule data information that indicates the data that wellness program manager 114 needs to send a wellness program file comprising payroll adjustment information to the payroll vendor system 106 or back to the employer; start date and end date information that indicates if any changes to a wellness status level occurs within this time period to include the changes for the particular payroll associated with this time frame. Additional information such as a starting and end period that indicates the time frame for paying an employee can also be included. It should be noted that the present invention is not limited to the particular columns and entries shown in FIG. 4. One or more columns can be added to and/or deleted from the employee information record 130. For example, in addition to the columns/entries shown in FIG. 4 information associated with dependents of the employees enrolled in a wellness program can also be included in the record 130.

The employee information record 130 further includes a "Wellness Program Enrollment" column 418 with entries 420 indicating whether or not an employee is enrolled in a wellness program. For example, employee "John A" is enrolled in a wellness program while employee "Lisa E" is not enrolled in a wellness program.

As discussed above, individuals can utilize various facilities such as (but not limited to) health clubs, dance studios, sporting complexes, and participate in services/activities such as (but not limited to) meetings, classes, walk-a-thons, marathons, and support groups as part of a wellness program. Each of these facilities and/or administrators of the services/programs maintain records of user participation. Each time a user utilizes a facility and/or participates in an activity or service, the facility or administrator records relevant information.

For example, FIG. 5 shows one example of a user participation record 148 comprising user participation information (e.g. employee usage information). In particular, the user participation record 148 includes a "User ID" column 502 that includes entries 504 with a unique identifier such as "User_1". These identifiers uniquely identify each user of the facility, service, or activity. A "User Name" column 506 includes entries 508 with a user's name. For example, the user ID "504" is associated with "John A". A "Date" column 510 includes entries 512 indicating the date(s) that a user associated with the entry 512 utilized the facility or participated in a service/activity. A "Time" column 514 includes entries 516 with time information corresponding to the date information under the "Date" column 510.

A "Wellness Enrollment" column 518 includes entries 520 that indicate whether or not a particular user is enrolled in a wellness program. For example, the user participation record 148 shows that user "John A" is enrolled in a participation program. The user information manager 156, 158 analyzes this column 518 to determine if user participation information needs to be transmitted to a wellness program administrator and/or a user's employer. If so, the user information manager 151, 153 transmits the participation to either the wellness program server 102 via the wellness program manager interface 140, 142 and/or to the employer server 104 via the employer server interface 152, 154. It should be noted that the present invention is not limited to the particular columns and entries shown in FIG. 5. One or more columns can be added to and/or deleted from the user participation record 148.

The user participation information 148, 150 can be transmitted from the information processing systems 108, 110 at any given interval such as (but not limited to) daily, monthly, quarterly, and in real-time. Also, the wellness program server 102 and/or the employer server 104 are not required to wait for the information processing systems 108, 110 to transmit the user participation information 148. For example, the wellness program server 102 and/or the employer server 104 can pull the user participation information 148 from the information processing systems 108, 110. If the employer server 104 receives/retrieves the user participation information 148, 150, the employer server 104 transmits this information 148, 150 to the wellness program server 102 via the wellness program manager interface 122.

The wellness program manager 114 stores user participation information 148 as part of the user information 120 in the member database 116 and associates a wellness program status level to each individual. For example, FIG. 3 shows examples of wellness program status levels such as (but not limited to) "Grace Period", "Blue/Inactive", "Bronze", "Silver", "Gold", and "Platinum" under the "Wellness Program Status Level" column 318. It should be noted that these levels are only examples and any form of status/level indication can be used.

In the example shown in FIG. 3 a wellness status of "Blue" (e.g. inactive) indicates that a user has enrolled in a wellness program but has not participated in the program, or has not participated in a wellness program within a given amount of time. A status level of "Grace Period" indicates that the individual has just been enrolled in a wellness program and is still within the grace period (e.g. 3 months). Within this grace period an individual can build his/her wellness status level. The remaining status levels shown "Bronze", "Silver", "Gold", and "Platinum" are levels ranging from low to high where a user associated with "Bronze" has a lower status level than a user associated with "Platinum".

In one embodiment, the wellness program manager 114 associates a wellness status level with an individual based on participation in the wellness program. The wellness status levels can be such that each level indicates a given degree of participation. As a user increases his/her participation in a wellness program, the status level associated with a user can increase. Similarly, the status level associated with a user can also decrease based on a decrease in participation or a lack of participation. Degrees or levels of participation can be quantified using various methods such as (but not limited) a point system, number of visits to a facility, and number of registrations for a service.

The following discussion illustrates one example of determining a wellness status level for an individual using a point system. Points can be allocated to an individual each time he/she uses a facility or service or based on weekly usage, monthly usage, quarterly usage, or the like. For example, wellness program points are awarded to an individual for joining a health club, using a health club, attending health classes, and for registering with a walk-a-thon. Different points can be award for different activities performed by the individual. For example, 1000 points can be awarded for joining a health club while 100 points can be awarded each time the individual uses a health club. Also, different points can be awarded for various aspects of a facility or service. For example, an individual may participate in difference classes offered by the health club each having a given number of points assigned thereto.

Other examples of earning points for a wellness program are now given. A smoking cessation program can be part of a wellness program, subject to payment of an activation fee, to all members of the program. Spouses and other dependents of the wellness program members may be eligible for the smoking cessation program for no charge, or at a rate below the standard market rate. Smokers who successfully quit smoking through the smoking cessation program earn wellness program points on submission of a non-smoker declaration, counter-signed by a representative of the smoking cessation program. Points are earned, for example, as follows:

Per principal or spouse submitting a declaration—5,000 points.

Points can be re-earned each wellness program year on submission of a new declaration.

A non-smoking wellness program principal member and/or spouse earn, for example, 5,000 wellness points on submission of a non-smoker declaration and agreement to a possible urine nicotine test. Points can be re-earned each wellness program year on submission of a new declaration. Another example of a service available for members of a wellness program is a weight reduction program. This is available, subject to payment of an activation fee, to all wellness program principal members. This weight reduction program membership is for the period until the member reaches their goal weight, as long as at least one session per month is attended. A lapse of no longer than 6 months will require a further payment of an activation fee to "reactivate" this facility. A lapse of longer than 6 months can be renewed at the rate below the standard market rate.

Spouses and other dependents of the wellness program members may be eligible for weight reduction programs for no charge, or at a rate below the standard market rate. Wellness program members who have successfully reached their goal weights through a weight reduction program are presented with a certificate to this effect. Submission of this certificate to the wellness program and/or the employer earns wellness points, for example, as follows:

Per member or dependent—5,000 points

To an annual maximum of—10,000 points

Points can be re-earned each wellness program year on submission of a new certificate.

A wellness program member or dependent who is at their goal weight earn wellness points on submission of a weight reduction program certificate stating this. These certificates are available from any weight reduction program facility, at a nominal fee payable by the member. Points can be re-earned each wellness program year on submission of a new certificate.

In addition, wellness program members are encouraged to make use of a medical advice line or website and to make use of preventive care options in order to prevent or minimize medical problems that might otherwise only be detected later, with corresponding higher medical costs. Examples of such preventive care options are as follows. 2,500 wellness points, for example, are awarded when a female member joins a Managed Maternity Program. 5,000 wellness points, for example, are awarded when a child of a wellness program member has completed their series of vaccinations (typically around 18 months of age). Points are awarded during the wellness program year in which the series of vaccinations was completed. The member claims these points by submission of a copy of their clinic card, detailing the completed series of vaccinations.

Figure 10:
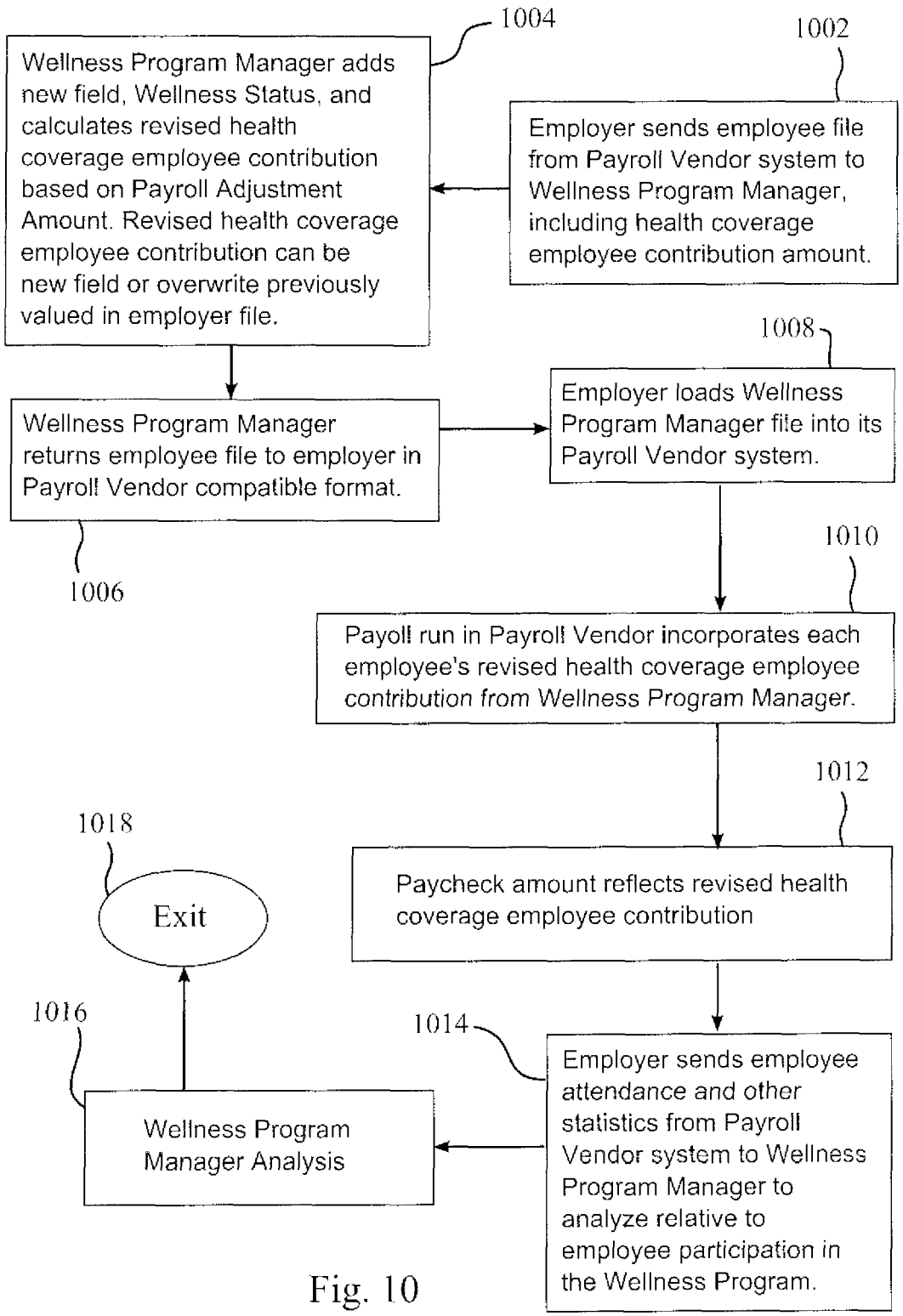
FIG. 10 is an operational flow diagram illustrating yet another example of adjusting employee payroll expenses based on a wellness program status level associated with an employee according to one embodiment of the present invention.

2,000 wellness points per adult, for example, are awarded each year that the adult is both a registered blood donor and donates at least one pint of blood. The member claims these points by submission of proof of donation (e.g., a copy of their blood donor card issued). 5,000 wellness points, for example, per adult woman (16 years±) are awarded each year that they have a pap smear. These points can be automatically awarded by interface with the claims system of the medical treatment program, based on practice type and tax code. Wellness points can also be awarded for following preferred procedures, such as pre-authorization of medical treatment. Examples of the above are indicated in FIG. 10 of co-pending U.S. patent application Ser. No. 09/982,274, which is hereby incorporated by reference in its entirety.

As discussed above, an individual's participation at each facility, service, and/or program is maintained as user participation information 148, 150 in the information processing systems 108, 110. The user participation information 148, 150 is then transmitted to either the employer server 104 and/or the wellness server 102 where corresponding wellness points are awarded to each individual based on the user participation information 148, 150.

For example, FIG. 6 shows a user information record 120 for employee E_2 (See FIG. 3) maintained by the wellness program server 102 comprising wellness point information for a particular user. It should be noted that although FIG. 6 shows a user information record 120 maintained by the wellness program server 102, a similar record, or similar information within the record 120 can be maintained by the employer server 104. For example, a similar record or information can be maintained by the employer server 104 in an embodiment where the employee information manager 126 awards points to a user based on user participation information 148, 150 received from the information process systems 108, 110.

The user information record 120 shown in FIG. 6 is created in part based on the user participation information 148, 150 (as shown in FIG. 5) received either from the information processing systems 108, 110 or the employer server 104. In particular, the user information record 120 includes a "Date" column 602 that includes entries 604 indicating a date that the individual utilized a facility or participated in a service/program. The user information record 120 also includes a "Facility/Service ID" column 606 including entries 608 that identify a facility, program, or service utilized by the individual on the corresponding date under the "Date" column 602.

A "Wellness Points" column 610 includes entries 612 that indicate an amount of points awarded to the individual for participating in the corresponding facility, program, or service under the "Facility/Service ID" column 606. The wellness server 102 and/or the employer server 104 can maintain a database (not shown) of point information that indicate how many points are to be awarded for user or registration in a facility, service, or program. It should be noted that the present invention is not limited to the particular columns and entries shown in FIG. 6. One or more columns can be added to and/or deleted from the user information record 120.

Based on the points accumulated by an individual, the wellness program manager 114 associates a wellness program status level as shown in FIG. 3 under the "Wellness Program Status" column 318. Each wellness program status level can be associated with a range of points. For example, a first range of points can be associated with a first status level, a second range of points can be associated with a second status level, and so on. The wellness program manager 114 can update an individual's wellness status level every day, month, quarter, year, or the like.

In one embodiment, a payback benefit is provided to each individual enrolled in a wellness program based on the wellness program status level associated with the individual. In this embodiment, the wellness program provides the payback benefit and not a health plan provider, and is therefore not a no-claim bonus paid out of a health plan. Although a wellness program can use health plan contributions as the basis for the payback benefit, the payback, in this embodiment, is not really a payback of health plan contributions, but rather a wellness program benefit that happens to be based on the contributions paid into the health plan.

The payback benefit, in this embodiment, includes an Above Threshold Benefit ("ATB") payback and a Managed Benefits ("MB") payback. The ATB payback benefit pays back a portion of the member's health plan ATB contributions if they have five complete and consecutive calendar years without claiming above their threshold. This threshold is a predetermined amount set by the health plan, and if the health plan member's annual claim does not exceed this threshold, the member qualifies for the payback. The portion of each year's contribution paid back at the end of the five-year period depends on the member's wellness status level at the end of that specific calendar year, based on the following table (Table 1):

TABLE 1

| Status At Year End | Payback |
|---|---|
| Blue | 5% |
| Bronze | 20% |
| Silver | 50% |
| Gold | 100% |

For example, assuming a member's ATB contribution is $2000 per annum and ignoring medical inflation, the ATB payback works as follows for given ATB claiming pattern and wellness program statuses:

TABLE 2

| Year | ATB Claim | Wellness Status | Payback % | Year's Payback | Total Potential Payback |
|---|---|---|---|---|---|
| 1 | N | Blue | 5% | 100 | $100 at end year 5 |
| 2 | N | Blue | 5% | 100 | $200 at end year 5 |
| 3 | N | Bronze | 20% | 400 | $600 at end year 5 |
| 4 | Y | Blue | — | 0 | $0 |
| 5 | N | Silver | 50% | 1000 | $1000 at end year 9 |
| 6 | N | Silver | 50% | 1000 | $2000 at end year 9 |
| 7 | N | Bronze | 20% | 400 | $2400 at end year 9 |
| 8 | N | Blue | 5% | 100 | $2500 at end year 9 |
| 9 | N | Blue | 5% | 100 | $2600 paid out* |
| 10 | N | Silver | 50% | 1000 | $1000 at end year 14 |

*In this example, this $2600 is the only amount actually paid to the member.

With respect to timing, the calculation of each year's contribution to the ATB payback is based on the previous calendar year's ATB claiming status and wellness status level (i.e. wellness status level as of December 31). The actual payback is made shortly after the fifth consecutive ATB claim-free calendar year.

In the current embodiment only complete claim-free calendar years count. So, for example, a member joining in February 2008 only starts being "monitored for ATB payback on Jan. 1, 2009. A new five-year period begins on January 1 of the year of a payback or on January 1 of the year following an ATB claim. In order to receive this benefit, the member should be a wellness program member following five complete, consecutive ATB claim-free calendar years and should have had uninterrupted membership of the wellness program throughout the five year period.

Each wellness program statement sent to the member details the accumulated potential ATB payback, for example as follows as show in Table 3. Potential ATB payback, should you make no ATB claims up until the end of [yyyy]:

TABLE 3

| Past years | R | |
| This year ([status] % of ATB prem.) | R | |
| Total potential payback | R | on [mm.dd.yy] |

Calculations for the above are as follows: the calculation for "past years" is an exact one, based on actual ATB contributions and wellness status levels. The calculation for "this year" is equal to ATB contribution paid to date this year×12−n×[current wellness status level status] % where n is the number of months' contributions paid during this calendar year.

With respect to the MB payback, this benefit pays back at age 65 (or any other pre-selected age), a portion of the member's wellness program Managed Benefits (i.e. Hospital, Insured Procedures and Chronic Illness Benefits) contributions for a given year if they claim from neither their Hospital Benefit, nor their Insured Procedures Benefit, nor ISOS during that year. Chronic Illness Benefit claims are ignored for this purpose. The payback benefits from the capital growth of, for example, unit trusts from the date accrued up until age 65. The portion of each year's contribution paid back at age 65 is dependent on the member's wellness status level at the end of that calendar year, based on Table 1 above or a set of different percentages.

On a pre-selected day e.g., April 30 of each year, if there were no Hospital, Insured Procedures Benefit or ISOS claims during the previous calendar year, the relevant proportion of that year's MB contribution are notionally allocated in equal proportions to selected unit trusts. For example:

Define

P=Dollar amount to be notionally allocated to unit trusts $SA$=Selling price of unit trust A on that April $30^{th}$ $SB$=Selling price of unit trust B on that April $30^{th}$ $SC$=Selling price of unit trust C on that April $30^{th}$ $NA$=Number of units notionally purchased in unit trust A on that April $30^{th}$ $NB$=Number of units notionally purchased in unit trust B on that April 30th $NC$=Number of units notionally purchased in unit trust C on that April $30^{th}$ Then $NA = 1/3 * P/SA$ and $NB = 1/3 * P/SB$ and $NC = 1/3 * P/SC$ NA, NB and NC are stored (to four decimal places) in respect of each member and increased each year (on 30 April) by the number of new units notionally purchased. SA, SB and SC are therefore inputs required by the system on April $30^{th}$ of each year.

With respect to payback at age 65, on March 30 of the year during which the member turns 65 (this is the definition of age 65 for purposes of this example of this benefit), the member is paid out their Managed Benefit payback as follows:

$RA$=Repurchase price of unit trust A on that April $30^{th}$ $RB$=Repurchase price of unit trust B on that $30^{th}$ $RC$=Repurchase price of unit trust C on that $30^{th}$ The payout is now equal to: $(NA*RA)+(NB*RB)+(NC*RC)$ plus the dollar amount of the MB payback "earned" in the previous calendar year, (i.e. the last year's MB payback does not benefit from capital growth of unit trusts).

For example, assuming a member's MB contribution is $6000 per annum and ignoring medical inflation, the MB payback works as follows for given claiming pattern and wellness status levels. For simplicity, the illustration is for someone aged 59 at entry. Assume that Unit prices (in Dollars) are as follows on 30 April of each year:

TABLE 4

| Year | SA | RA | SB | RB | SC | RC |
|---|---|---|---|---|---|---|
| 1 | 1.10 | 1.00 | 2.20 | 2.00 | 3.30 | 3.00 |
| 2 | 1.21 | 1.10 | 2.42 | 2.20 | 3.63 | 3.30 |
| 3 | 1.33 | 1.21 | 2.66 | 2.42 | 3.99 | 3.63 |
| 4 | 1.46 | 1.33 | 2.93 | 2.66 | 4.39 | 3.99 |
| 5 | 1.61 | 1.46 | 3.22 | 2.93 | 4.83 | 4.39 |
| 6 | 1.77 | 1.61 | 3.54 | 3.22 | 5.31 | 4.83 |
| 7 | 1.95 | 1.77 | 3.89 | 3.54 | 5.84 | 5.31 |

Then the paybacks are calculated as follows:

TABLE 5

| Year | Age | HB/IPB Claim | Status Level | Payback % | Year's Payback | New Units A | B | C | Total Units NA | NB | NC |
|---|---|---|---|---|---|---|---|---|---|---|---|
| 1 | 59 | N | Blue | 5% | 300 | 91 | 45 | 30 | 91 | 45 | 30 |
| 2 | 60 | N | Blue | 5% | 300 | 83 | 41 | 28 | 17 | 86 | 58 |
| 3 | 61 | Y | Bronze | — | — | — | — | — | 17 | 86 | 58 |
| 4 | 62 | N | Silver | 50% | 3000 | 685 | 341 | 228 | 859 | 427 | 286 |
| 5 | 63 | Y | Blue | — | — | — | — | — | 859 | 427 | 286 |
| 6 | 64 | N | Bronze | 20% | 1200 | Not Allocated | | | 859 | 427 | 286 |

The total payout on April $30^{th}$ of year 7 is then calculated as: $(859*1.77)+(427*3.54)+(286*5.31)+1200=\$5751$ In this embodiment, only complete claim-free calendar years count. No Managed Benefit paybacks are made after age 65. So, any member entering after January $1^{st}$ of the year during which they turn 64 is not eligible for this benefit. In order to receive this benefit, the member must be a wellness program member April $30^{th}$ (in this example) of the year during which they turn 65. A member leaving the health plan and/or the wellness program forfeits their entire payback for the first period of membership unless contributions are back-paid to the date of leaving.

Each wellness program statement sent to the member will detail the total number of units in each of the unit trusts as follows:

TABLE 6

| Unit trust | Number of units | Current market value |
|---|---|---|
| A | NA | NA | *RA |
| B | NB | NB | *RB |
| C | NC | NC | *RC |
| Total | | |

With respect to the ATB and MB paybacks discussed above, a member who changes employer, but remains on the wellness program, does not forfeit any accumulated paybacks, provided the same wellness program membership number is retained. In the case of a divorce, the accumulated payback benefits are retained by the principal member. In the case of a death, if there is no spouse on the membership, any accumulated paybacks are lost. If there is a spouse, the spouse becomes the principal member and the accumulated paybacks are retained. The MB payback is now paid out when the spouse reaches 65. If at the time of the principal's death, the spouse is over 65, the MB payback is forfeited. Member movements have an effect on the payback benefit. For example, if a child is added with effect from September 1st, then the relevant contribution in respect of that child is included for the 4 months of that year in the calculation of the potential payback. Similarly, if a member is on one plan for 7 months and another plan for 5 months, the contribution counting towards the potential payback will be a combination of 7 months on the first plan and 5 months on the second plan.

In addition to the above embodiments, a wellness program can be customized for an individual based on the individual's lifestyle. Therefore, an individual can follow a personally tailored wellness program rather than having to comply with a general wellness program. In this embodiment, personal information pertaining to a member such as an employee or a potential wellness program member is obtained. The personal information includes at least the individual's age and gender. In addition, health information pertaining to the individual is received. The health information includes lifestyle factors such as exercise, diet, and smoking to name but a few examples, as well as clinical factors such as blood pressure, cholesterol and weight to name but a few examples. For example, the health information includes information relating to the individual's current health and includes at least some of the individual's eating habits, whether they are a smoker or a non-smoker, their exercise habits and whether or not they have any chronic health conditions to name but a few examples.

The personal information and the health related information are then used to determine a tailored wellness program for the individual. The wellness program typically includes a plurality of program areas with which the individual must comply. In addition, the personal information and the health information are used to calculate a relative health risk of the individual and then using the calculated relative health risk of the individual as a factor to determine the reward awarded to the individual. Based on the health and lifestyle factors which include an amount of physical activity, dietary habits, smoking status, as well as existence of certain chronic diseases, the impact of lifestyle behaviours and health parameters for the individual are calculated and shown how this may increase morbidity and mortality. As a result, the points, discussed above, that are available are recalibrated to be weighted according to the individual's health risk factors. In addition, the scoring helps determine which areas the individual needs to focus on for his/her health to improve and a pathway for the individual is created to follow where the individual's points are weighted according to his/her health risks. As the health risks are adjusted, the individual's points and wellness program are adjusted as well.

Examples of such wellness programs tailored for individuals are as follows. Sally is 37 years old, does no exercise, only eats 2 servings of vegetables and fruit daily and is diabetic. In addition, she smokes, has a raised cholesterol level and is overweight. Her blood pressure is within the normal range, despite having a few alcohol based drinks each night.

Sally's calculated health age or health risk is 58. This is based on the relative risk that Sally's lifestyle and health factors pose. The fact that Sally smokes adds a certain risk to her from a mortality perspective with regards to chronic diseases of lifestyle. This is represented as an increased age. So each of these factors have a number linked to them with 1.0 being zero risk, less than 1.0 if the lifestyle factor such as exercise provides health benefits thus providing longevity and greater than 1 if a health risk is posed. This calculation changes over time as new clinical evidence develops. A tailored wellness program for Sally highlights the following areas of risk and allocates points to these areas.

TABLE 7

|  | Increased Risk | Personal Points |
| --- | --- | --- |
| Diabetes | 76 | 6,000 |
| Cholesterol | 68 | 5,500 |
| Smoking | 53 | 4,500 |
| BMI | 51 | 4,000 |
| Physical activity | 32 | 2,500 |
| Alcohol intake | 29 | 1 |
| Nutrition | 25 | 2,000 |

The number of points are calculated and allocated based on the individual's overall risk. For example, someone who has a risk that is double what it should be will be allocated 50% more points than someone who is healthy. The additional points that are allocated to the individual are linked to the various health and lifestyle risk factors that pertain to that individual. In this example the diabetes is the most significant risk factor so most of the points are allocated to that factor, then cholesterol etc. If insufficient physical activity is the only risk factor (as per example below) all the additional points will be allocated to that.

Based on the above Sally is allocated points if she met the following targets.

TABLE 8

| Sally's Wellness Personal Pathway | Available points (24,000) | My personal goal |
| --- | --- | --- |
| Manage your HbA1C | 6,000 | I will reduce my BMI by 10% in the next 3 months |
| Reduce your cholesterol | 5,500 | |
| Stop smoking! | 4,500 | |
| Lose weight | 4,000 | |
| Increase your physical activity | 2,500 | |
| Improve your diet! | 2,000 | |
| Reduce your alcohol intake | Referral to credible alcohol partners (e.g. AA; SANCA) | |

Where the goal is defined such as to stop smoking Sally is awarded all of the 4,500 points for stopping smoking and no points if she does not. However, where the goal is not so defined there is typically point amounts associated with the goal. So if Sally is asked to lose a certain amount of weight before she is allocated the 4,000 points for losing weight. This may be tiered so that reaching certain thresholds gives the individual access to certain rewards or greater rewards. The personal goal column is suggested by Sally after she has been shown what her risk factors are and she is then provided with additional incentive (points) to set a particular short term goal which she can choose from the list.

In another example, Bob is 31 years old, finds exercise difficult and does not like vegetables & fruit. He smokes and drinks alcohol in excess. Despite his unhealthy lifestyle habits, his health measurements are all in the normal range. His calculated health age is 37. A tailored wellness program for Bob highlights the following areas of risk and allocates points to these areas.

TABLE 9

|  | Increased Risk | Personal Points |
| --- | --- | --- |
| Smoking | 53 | 4,500 |
| Physical activity | 32 | 2,500 |
| Alcohol | 29 | 1 |
| Nutrition | 25 | 2,000 |

Based on the above Bob would be allocated points if he met the following targets.

TABLE 10

| My Wellness Personal Pathway | Available points (9,000) | My personal goal |
| --- | --- | --- |
| Stop smoking! | 4,500 | I will quit in the next 3 months |
| Increase your physical activity | 2,500 | |
| Improve your diet! | 2,000 | |
| Reduce your alcohol intake | Referral to credible alcohol partners (e.g. AA; SANCA) | |

In a further example, Alan is a healthy 40 year old male but needs encouragement to exercise a bit more—he currently manages about 45 minutes per week. His vegetable and fruit intake is average (4 servings daily) and his cholesterol is 4.5 mmol/l. His calculated health age is 41. A tailored wellness program for Alan highlights the following areas of risk and allocates points to these areas.

TABLE 11

|  | Increased Risk | Personal Points |
| --- | --- | --- |
| Physical activity | 32 | 1,000 |
| Nutrition | 25 | 500 |
| Cholesterol level | 23 | 500 |

Based on the above Alan would be allocated points if he met the following targets.

TABLE 12

| My Wellness Personal Pathway | Available points (2,000) | My personal goal |
| --- | --- | --- |
| Increase your physical activity | 1,000 | I will become fit enough to reach level 4 at my next Wellness Fitness Assessment! |
| Improve your diet! | 500 | |
| Manage your cholesterol | 500 | |

In a final example, at 25 Jane is the picture of health. Jane's healthy lifestyle is keeping her calculated health well below her actual age. Her calculated health age is 22.5. Jane's only goal is therefore to maintain her current status. Jane may obtain points based on a general wellness program points structure, i.e., for going to gym, but is not be given any additional points as she is not at risk.

Once the member has his/her wellness program, information is received periodically regarding the individual's compliance or non-compliance with the wellness program. Points are awarded to the individual for compliance with the wellness program and in accordance with personal targets that have been set out. At predetermined intervals, the total number of points awarded to the individual is calculated and a reward is then awarded to the individual based on the total number of points accumulated.

Figure 7:
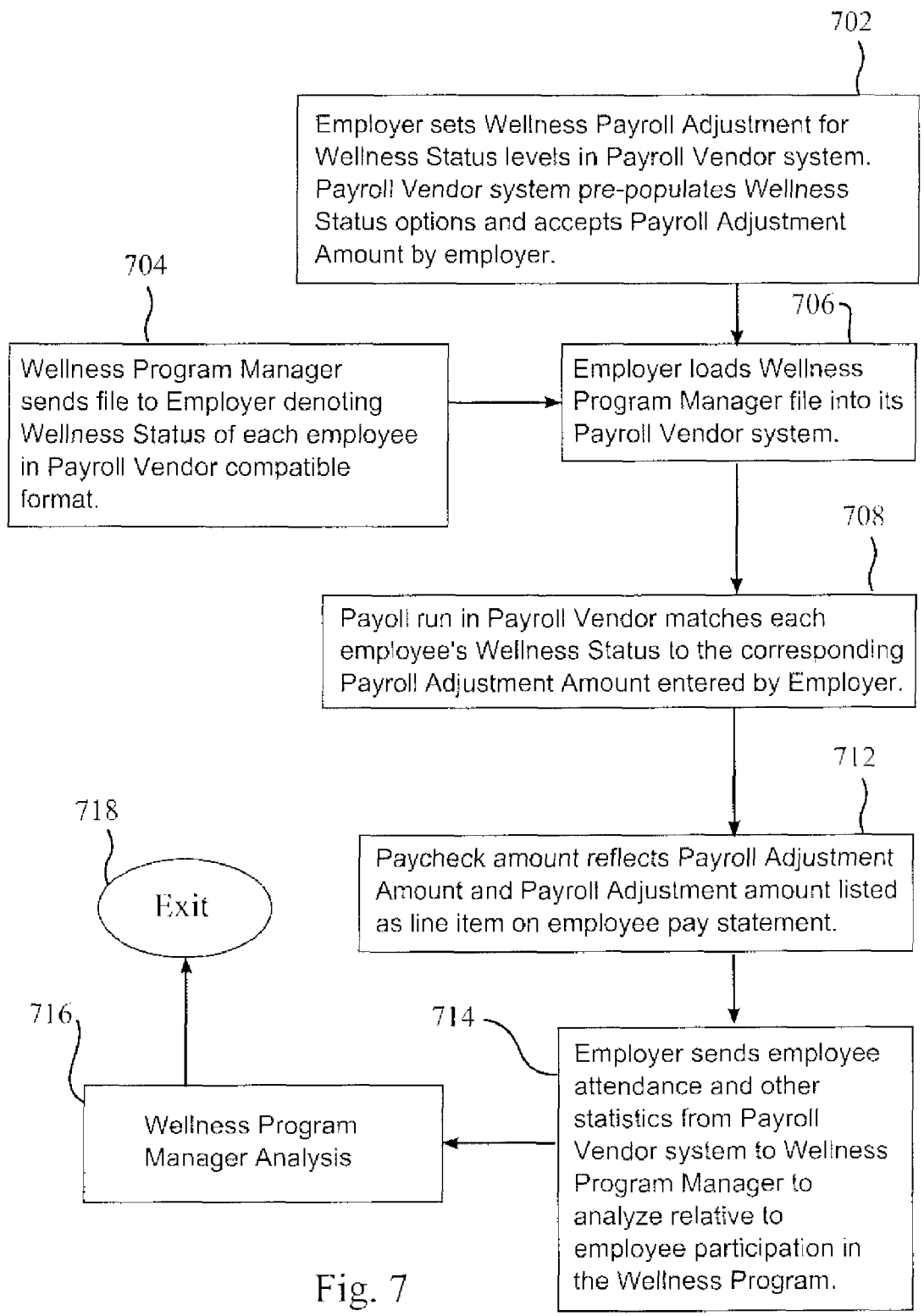
FIG. 7 is an operational flow diagram illustrating one example of adjusting employee payroll expenses based on a wellness program status level associated with an employee according to one embodiment of the present invention.

The following discussion illustrates additional embodiments of the present invention with respect to benefits of a wellness program. In particular, the following embodiments are directed to adjustment of an employee's payroll expense by his/her employer based on the employee's wellness program status level. One embodiment directed towards payroll expense adjustment is illustrated by the operational flow diagram of FIG. 7. An employer, at step 702, sets a wellness payroll adjustment for wellness status levels at the payroll vendor server 106 via the payroll manager interface 124. For example, the employer can set a specific dollar amount that is to be used for payroll adjustment for each wellness status level, a percentage of a health plan contribution, or a percentage of pre-tax or post-tax dollar amounts. It should be noted that maximum payroll adjustment amounts may vary from state-to-state. If so, the wellness program manager 114 can manage these variances and/or instruct the employer accordingly. For example, the wellness program manager 114 can adjust the payroll adjustment amount based on any state limitation on the subsidy or surcharge.

The payroll manager 132 pre-populates wellness program status level options for employees of the employer and accepts the wellness payroll adjustment information entered by the employer. The employer via the wellness program manager interface 122, at step 704, receives user participation information 120 for each employee from the wellness program server 102. The user participation information 120 can be received at any given interval and in this example is at least once a month so that employee payroll information can be adjusted accordingly. Also, the user participation information 120 is sent from the wellness program server 102 in a payroll vendor compatible format. This allows the employer, at step 706, to load the file received from the wellness program server 102 comprising the user participation information 120 into the payroll vendor system 106. In other words, the user participation information 120 can be integrated into the payroll vendor files 136, 138 without a conversion process.

The payroll manager 132 can then update employee payroll information accordingly. For example, FIG. 8 shows an example of a record 136 maintained for each employer client of the payroll vendor. The record 136 includes employer information 138. In particular, the employer record 136 includes an "Employee ID" column 802 including entries 804 with unique employee IDs. These IDs uniquely identify each employee of the employer. An "Employee Name" column 806 includes entries 808 with the names of each employee. An "Employee Address" column 810 includes entries 812 with an address associated with each employee.

The employer record 136 also includes a "Current Payroll Information" column 814 with entries 816 including payroll information for each employee. For example, FIG. 8 shows that employee "John A" is to receive $3000 for this particular payroll period. An "Employee Contribution" column 818 includes entries 820 identifying any health contribution amounts that are to be deducted from an employee's paycheck. For example, FIG. 8 shows that employee "John A" is to have $125 deducted from his paycheck for a health plan contribution.

The employer record 136 also includes wellness status level information under the "Wellness Program Status Level" column 822. This column 822 includes entries 824 indicating the current wellness status level (if applicable) of each employee. For example, FIG. 8 shows that employee "John A" has a wellness status level of "Bronze". It should be noted that the present invention is not limited to the particular columns and entries shown in FIG. 8. One of more columns can be added to and/or deleted from the employer record 136.

Returning to FIG. 7, the payroll manager 132 matches each employee's wellness status level to the corresponding wellness payroll adjustment amount entered in by the employer at step 702. For example, FIG. 8 shows a "Payroll Adjustment Amount" column 826 with entries 828 indicating a particular payroll adjustment amount or payroll adjustment category. The payroll manager 132 then adjusts the employees' payrolls accordingly. It should be noted that As can be seen, the employer has indicated that for a "Bronze" status, a payroll adjustment amount of "WP_A" is to be applied to the paycheck of "John A". This payroll adjustment amount can either be a dollar amount of a percentage amount. For example, assume that the employer has notified the payroll vendor that the payroll adjustment amount "WP_A" is to be applied to employee John A's health plan contributions or any employee with a status level of "Bronze". Employee John A is scheduled to have $125 deducted from his paycheck for his health plan contribution.

However, because John A has a wellness status level of "Bronze", the contribution amount is to be adjusted by "WP_A". For example, if the payroll adjustment amount "WP_A" is equal to 20% of a contribution, Johan A's contribution is reduced by 20% or $125*0.20=$25. Therefore, instead of $125 being deducted from John A's paycheck, $100 is deducted. In this embodiment, the higher a wellness status level (e.g. the higher the participation level of an employee in a wellness program is) the higher the payroll adjustment amount is. However, the presently claimed invention is not limited to such an embodiment. It should be noted that a health plan contribution adjustment is used as only one example. Other aspects of an employee's payroll can also be adjusted or a rebate can be given instead.

The payroll manager 132, at step 710, generates the paycheck with an amount that reflects the payroll adjustment amount (e.g. "WP_A") discussed above. The payroll adjustment amount can also be listed on the paycheck as a line item on an employee pay statement. The employer, at step 712, sends employee attendance and other statistics from the payroll vender system to the wellness program server 102 relative to wellness engagement. The wellness program manager 114, at step 714, can then analyze this information accordingly to update wellness status levels and/or make a determination is a wellness program is effective. The control flow then exits at step 716.

Figure 9:
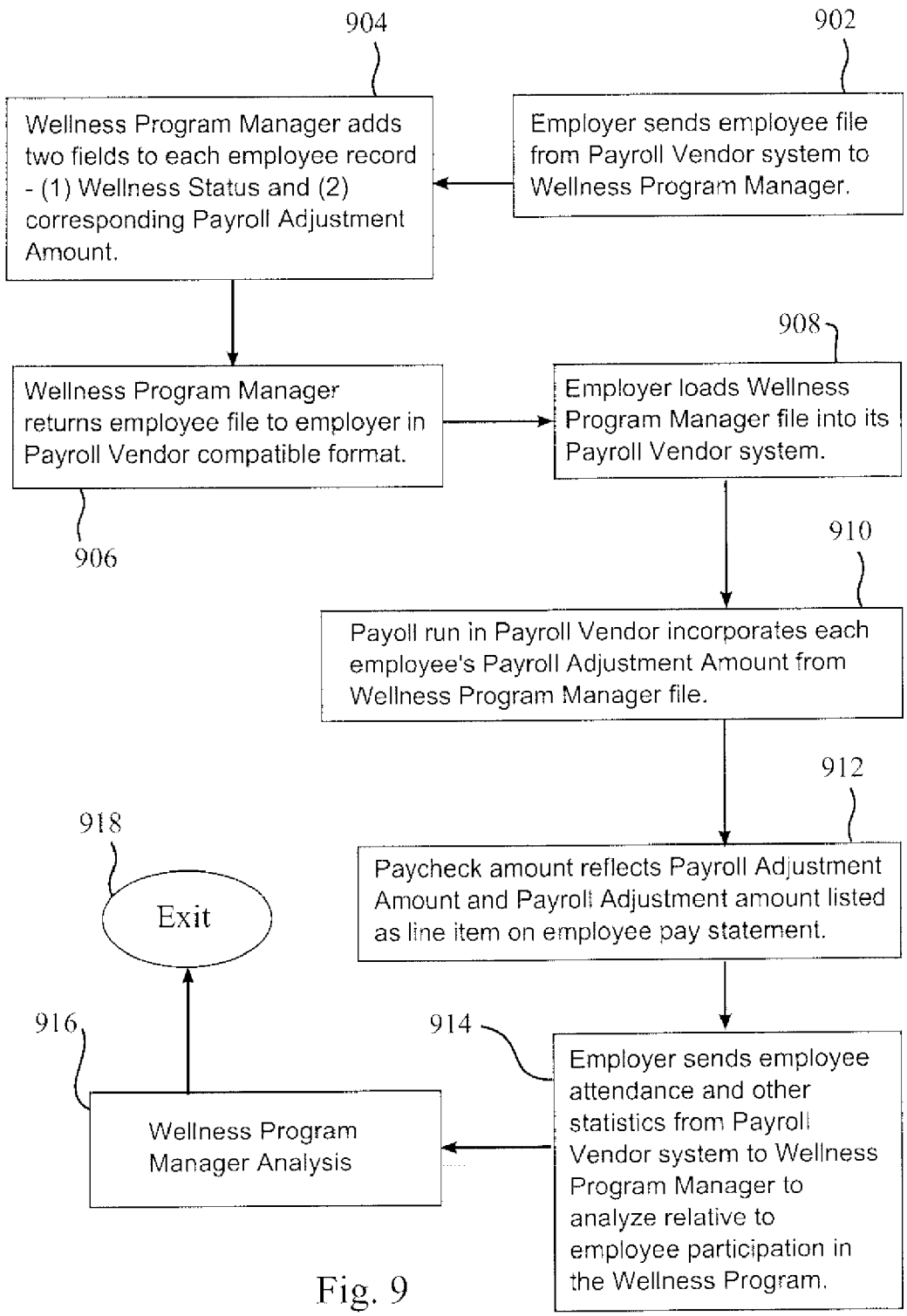
FIG. 9 is an operational flow diagram illustrating another example of adjusting employee payroll expenses based on a wellness program status level associated with an employee according to one embodiment of the present invention.

Another embodiment directed towards employee payroll expense adjustment is illustrated by the operational flow diagram of FIG. 9. The employer, at step 902, sends employee information files 138 from the payroll vendor to the wellness program server 102 via the wellness program manager interface 122. The file 138 can be a single file as shown in FIG. 8 or a separate file 136 for each employee. If a separate file is sent, each row of the record 136 in FIG. 8 can be a separate file. Also, the file sent to the wellness program server 102 is similar to the record shown in FIG. 8 without the "Wellness Program Status" column or the "Payroll Adjustment Amount" column.

The wellness program manager 114, at step 904, adds two fields to each employee payroll record. For example, the wellness program manager 114 adds the "Wellness Program Status" and the "Payroll Adjustment Amount" fields to the file 138. This results in the employee payroll file being substantially similar to that shown in FIG. 8. The wellness program manager 114, at step 906, returns the employee payroll file 138 to the employer in a payroll vendor compatible format. This allows the employer, at step 908, to load the file 138 received from the wellness program server 102 comprising the "Wellness Program Status" and "Payroll Adjustment Amount" information into the payroll vendor system 106. In other words, the payroll vendor can simply use this file 138 as a payroll file.

The payroll manager 132, at step 910, can then update employee payroll information accordingly, as discussed above with respect to FIG. 7. For example, employees' payroll amounts are left unchanged or increased based on the payroll adjustment amount associated with the employee. The payroll manager 132, at step 912, generates the paycheck with an amount that reflects the payroll adjustment amount discussed above. The payroll adjustment amount can also be listed on the paycheck as a line item on an employee pay statement. The employer, at step 914, sends employee attendance and other statistics from the payroll vender system to the wellness program server 102 relative to wellness engagement. The wellness program manager 114, at step 716, can then analyze this information accordingly to update wellness status levels and determine the effectiveness of a wellness program. The control flow then exits at step 918.

Another embodiment directed towards employee payroll expense adjustment is illustrated by the operational flow diagram of FIG. 10. The employer, at step 1002, sends employee information files 138 from the payroll vendor to the wellness program server 102 via the wellness program manager interface 122. The file 136 can be a single file as shown in FIG. 8 or a separate file 138 for each employee. If a separate file is sent, each row of the record 130 in FIG. 8 can be a separate file. Also, the file 138 is similar to the record shown in FIG. 8 without the "Wellness Program Status" column or the "Payroll Adjustment Amount" column. Also, in this embodiment, the payroll file 136 includes employee health plan contribution information as shown in FIG. 8 under column 818. The embodiments discussed above with respect to FIGS. 7 and 9 do not need to include the health contribution information.

The wellness program manager 114, at step 1004, adds a field to each employee payroll record. For example, the wellness program manager 114 adds the "Wellness Program Status" field 822 to the file 138. This results in the employee payroll file 138 being substantially similar to that shown in FIG. 8 without the "Payroll Adjustment Amount" column. The wellness program manager 114 also revises the health contribution amount for each employee under the "Health Contribution" column based on a payroll adjustment amount corresponding to the employee's wellness status level. In this embodiment, the wellness program manager 114 can maintain the payroll adjustment information or can receive this information from the employer as discussed above with respect to FIG. 7.

The wellness program manager 114, at step 1006, returns the employee payroll file 138 to the employer in a payroll vendor compatible format. This allows the employer, at step 1008, to load the file received from the wellness program server 102 comprising the "Wellness Program Status" and updated health contribution information. In other words, the payroll vendor can simply use this file 138 as a payroll file.

The payroll manager 132, at step 1010, can then incorporate the payroll information received from the employer at step 1008 and updated by the wellness program manager 114 at step 1006. The payroll manager 132, at step 1012, generates the paycheck with an amount that reflects the updated health contribution information. The employer, at step 1014, sends employee attendance and other statistics from the payroll vender system to the wellness program server 102 relative to wellness engagement. The wellness program manager 114, at step 1016, can then analyze this information accordingly to update wellness status levels and monitor the effectiveness of a wellness program. The control flow then exits at step 1018.

NON-LIMITING EXAMPLES

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A computer implemented method for managing a wellness program, using at least one computer, comprising:
   receiving, using the at least one computer, employee usage information associated with at least one employee's usage of a wellness program;
   determining, using the at least one computer, based on the employee usage information, a status level associated with the at least one employee for the wellness program, wherein a status level indicates a degree of participation in the wellness program;
   creating a data set, using the at least one computer, comprising a base pay, information pertaining to an employee health contribution, and a wellness status level corresponding to participation of the at least one employee in the wellness program, wherein the data set is in a format usable by a payroll vendor without a requirement for manually entering the data set; and
   sending the data set, using the at least one computer, as instructions to the payroll vendor of an employer of the at least one employee, wherein a pay of the at least one employee is to be changed based upon the created data set, the payroll adjustment amount to be calculated by the payroll vendor corresponding to the wellness status level and a payroll adjustment amount set for each wellness status level.

2. The computer implemented method of claim 1, wherein the employee usage information is received from the employer.

3. The computer implemented method of claim 1, wherein the employee usage information is received from at least one of a wellness program facility and a wellness program service provider.

4. The computer implemented method of claim 1, wherein the employee usage information includes information associated with a plurality of separate and distinct occurrences of wellness program participation by the at least one employee.

5. The computer implemented method of claim 4, wherein determining a status level associated with the at least one employee for the wellness program further includes:
   assigning a given point value to each separate and distinct occurrence of wellness program participation;
   determining, using the at least one computer, a total point value based on an accumulation of each given point value assigned to each separate and distinct occurrence of wellness program participation comparing the total point value to a plurality of point ranges, each point range in the plurality of point ranges being associated with a status level;
   identifying a point range in the plurality of point ranges corresponding to the total point value; and
   assigning a status level associated with the point range that has been identified to the at least one employee.

6. The computer implemented method of claim (1), wherein the payroll vendor
   identifies the status level associated with at least the one employee.

7. The computer implemented method of claim 1, wherein the data set can be integrated into the payroll data files without a data conversion process.

8. The method of claim 1, wherein the payroll adjustment amount is a payout proportional to a degree of participation in the wellness program.

9. The method of claim 1, wherein the payroll adjustment amount is a rebate based upon a degree of participation in the wellness program and a total amount of a plurality of health contributions made by the employee, wherein the rebate is proportional to at least one of a degree of participation in the wellness program and a total amount of a plurality of health contributions of the employee.

10. An information processing system for managing a wellness program comprising:
   a memory;
   a processor communicatively coupled to the memory; and
   a wellness program manager communicatively coupled to the memory and the processor, wherein the wellness program manager is adapted to:
   receive employee usage information associated with at least one employee's usage of a wellness program, wherein the employee usage information includes information associated with a plurality of separate and distinct occurrences of wellness program participation by the at least one employee;
   determine, based on the employee usage information, a status level associated with the at least one employee for the wellness program, wherein a status level indicates a degree of participation in the wellness program;
   create a data set comprising a base pay, information pertaining to an employee health contribution, and a wellness status level corresponding participation of the at least one employee in the wellness program, wherein the data set is in a format usable by a payroll computer server system; and
   send the data set to as instructions to the payroll computer server system whereby a payroll adjustment for the at least one employee may be modified by the payroll vendor corresponding to the wellness status level and a payroll adjustment amount set for each wellness status level.

11. The information processing system of claim 10, wherein the employee usage information is received from the employer.

12. The information processing system of claim 10, wherein the employee usage information is received from at least one of a wellness program facility and a wellness program service provider.

13. The information processing system of claim 10, wherein the wellness program manager is further adapted to determine a status level associated with the at least one employee for the wellness program by:
   receiving the employee usage information from an information processing system;
   assigning a given point value to each separate and distinct occurrence of wellness program participation;
   determining a total point value based on an accumulation of each given point value assigned to each separate and distinct occurrence of wellness program participation
   comparing the total point value to a plurality of point ranges, each point range in the plurality of point ranges being associated with a status level;
   identifying a point range in the plurality of point ranges corresponding to the total point value; and
   assigning a status level associated with the point range that has been identified to the at least one employee.

14. The information processing system of claim (10), wherein the payroll vendor:
   identifies the status level associated with at least the one employee.

15. A computer implemented method for managing a wellness program, using at least one computer, comprising:
   receiving, using the at least one computer, employee usage information associated with at least one employee's usage of a wellness program;
   creating, using the at least one computer, a payroll data set associated with the at least one employee, the data set including employment base pay information pertaining to an employee health contribution, and a wellness status level corresponding to participation of the at least one employee in the wellness program, wherein the data set is in a format usable by a payroll vendor without a requirement for manually entering the data set;
   determining, using the at least one computer and based on the employee participation information, a status level associated with the at least one employee for the wellness program, wherein a status level indicates a degree of participation in the wellness program;
   sending the payroll data set, using the at least one computer, to a payroll server system, whereby a payment to the at least one employee may be modified by the payroll vendor corresponding to the wellness status level and a payroll adjustment amount set for each wellness status level.

16. The computer implemented method of claim 15, further comprising:
   determining, based on the status level associated with the at least one employee, a Previously presented health insurance contribution amount associated with the at least one employee; and
   updating the payroll data set with at least the status level and the Previously presented health insurance contribution amount.

17. The computer implemented method of claim 15, wherein the employee usage information includes information associated with a plurality of separate and distinct occurrences of wellness program participation by the at least one employee.

18. The computer implemented method of claim 17, wherein determining a status level associated with the at least one employee for the wellness program further includes:
   assigning a given point value to each separate and distinct occurrence of wellness program participation;
   determining a total point value based on an accumulation of each given point value assigned to each separate and distinct occurrence of wellness program participation;
   comparing the total point value to a plurality of point ranges, each point range in the plurality of point ranges being associated with a status level;
   identifying a point range in the plurality of point ranges corresponding to the total point value; and
   assigning a status level associated with the point range that has been identified to the at least one employee.

19. The computer implemented method of claim 15, wherein the employee usage information is received from at least one of:
   the employer;
   a wellness program facility; and
   a wellness program service provider.

20. The computer implemented method of claim 15, wherein the payroll adjustment is based upon at least one of a monetary amount and a percentage amount associated with at least the one employee based on the status level associated with the at least one employee.

* * * * *